United States Patent
Sosa et al.

(10) Patent No.: US 11,083,197 B2
(45) Date of Patent: Aug. 10, 2021

(54) HERBICIDAL COMPOSITION COMPRISING CHROMONE DERIVATIVES AND A METHOD FOR WEED CONTROL

(71) Applicants: INVESTIGACIONES BIOLÓGICAS EN AGROQUÍMICOS ROSARIO S.A., Rosario Pcia. de Santa Fe (AR); Federico Ortega, Rosario Pcia. de Santa Fe (AR); THE UNITED STATES OF AMERICA, AS REPRESENTED BY THE SECRETARY OF AGRICULTURE, Washington, DC (US)

(72) Inventors: Gustavo M. Sosa, Rosario Pcia. de Santa Fe (AR); Lucia M. Travaini, Rosario Pcia. de Buenos Aires (AR); Helmut Walter, Obrigheim (DE); Charles Cantrell, Oxford, MS (US); Stephen Duke, Oxford, MS (US); Nestor Carrillo, Rosario Pcia. de Santa Fe (AR); Eduardo Ceccarelli, Rosario Pcia. de Santa Fe (AR)

(73) Assignees: Investigaciones Biologicas en Agroquimicos Rosario S.A., Rosario (AR); The United States of America, as represented by the Secretary of Agriculture, Washington, DC (US); Frederico J. Ortega, Rosario (AR)

( * ) Notice: Subject to any disclaimer, the term of this patent is extended or adjusted under 35 U.S.C. 154(b) by 370 days.

(21) Appl. No.: 16/067,296

(22) PCT Filed: Dec. 30, 2016

(86) PCT No.: PCT/IB2016/058116
§ 371 (c)(1),
(2) Date: Jun. 29, 2018

(87) PCT Pub. No.: WO2017/115333
PCT Pub. Date: Jul. 6, 2017

(65) Prior Publication Data
US 2019/0021328 A1 Jan. 24, 2019

Related U.S. Application Data

(60) Provisional application No. 62/272,880, filed on Dec. 30, 2015.

(51) Int. Cl.
*A01N 43/90* (2006.01)
*A01N 43/16* (2006.01)

(52) U.S. Cl.
CPC ............. *A01N 43/90* (2013.01); *A01N 43/16* (2013.01)

(58) Field of Classification Search
CPC .................................. A01N 43/90; A01N 43/16
See application file for complete search history.

(56) References Cited

U.S. PATENT DOCUMENTS

| | | | | | |
|---|---|---|---|---|---|
| 4,065,574 | A | * | 12/1977 | Moon | A01N 43/16 514/456 |
| 5,793,035 | A | * | 8/1998 | Beck | A01M 7/0089 250/222.1 |
| 6,034,121 | A | * | 3/2000 | O'Mahony | A01N 43/16 514/456 |
| 2008/0166438 | A1 | * | 7/2008 | Zhao | A61K 36/48 424/744 |
| 2013/0323338 | A1 | * | 12/2013 | Mensah | A61K 36/48 424/757 |

FOREIGN PATENT DOCUMENTS

WO    WO 9832752 A1    7/1998
WO    WO 9919318 A1    4/1999

OTHER PUBLICATIONS

M. Maleck, "Khellin: A furanochromone with toxicity against Oncopeltus fasciatus (Hemiptera) and Aedes aegypti (Diptera)," Journal of Natural Pharmaceuticals, vol. 4, Issue 1, Jan.-Jun. 2013, pp. 32-36.*

Khan, Allelopathy of *Ammi visnaga* (L.) LAM towards legumes, Herbologia, Apr. 1, 2012, pp. 11-19, 13-1.

Mubarik et al., Allelopathic Effects of Important Weeds on Germination and Growth of Maize (*Zea mays* L.), Pakistan Journal of Weed Science Research, Jun. 1, 2015, pp. 173-180, 21-2.

(Continued)

*Primary Examiner* — Monica A Shin
(74) *Attorney, Agent, or Firm* — John D. Fado; G. Byron Stover

(57) ABSTRACT

An herbicidal composition comprising one or more compounds of Formula I:

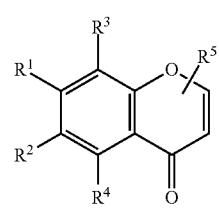

where $R^1$ and $R^2$ are H or taken together with the carbon atoms to which the are attached form a furane ring; $R^3$ and $R^4$ each independently represent H, —OH or —O—($C_1$-$C_4$) alkyl; and $R^5$ is H, ($C_1$-$C_4$) alkyl, —($C_1$-$C_2$) alkylene-O-glucoside or —COOH; and an agriculturally acceptable vehicle. There is also disclosed a method for weed control by application of compounds of Formula I and the use of the composition for controlling weeds.

11 Claims, 30 Drawing Sheets

(56) References Cited

OTHER PUBLICATIONS

Al-Snafi et al., Chemical Constituents and Pharmacological Activities of Ammi Majus and Ammi Visnaga. A Review, International Journal of Pharmacy and Industrial Research, Jan. 1, 2013, pp. 257-265, 3-1.

Guenaydin et al., The chemical investigations on the ripe fruits of Ammi visnaga (Lam.) lamarck growing in turkey, Natural Product Research, Apr. 1, 2004, pp. 169-175, 18-2.

Sohndhia et al., Phytotoxic Furanocoumarins from the shoots of Semenovia transiliensis, Natural Product Communications, Jan. 1, 2012, pp. 1327-1330, 7-10.

Duke, Bishop's Weed (*Ammi majus* L., Apiaceae) Economic Botany, Jul. 1, 1988, pp. 442-445, 42-3.

Travaini et al., Khellin and Visnagi n, Furanochromones from *Ammi visnaga* (L.) Lam., as Potential Bioherbicides, Journal of Agricultural and Food Chemistry, Dec. 21, 2016, pp. 9475-9487, 64-50.

\* cited by examiner

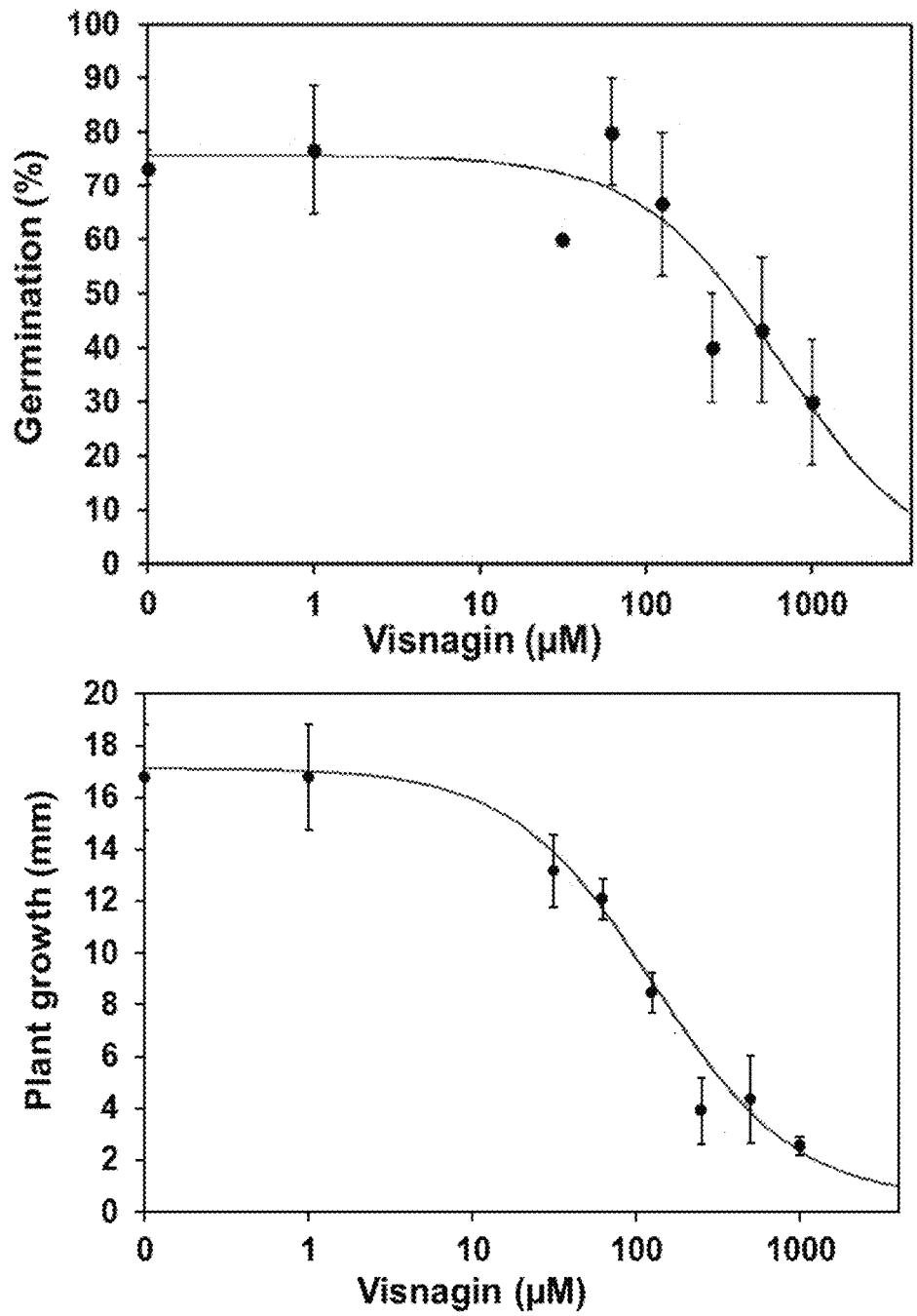
FIG. 1 (Continuation)

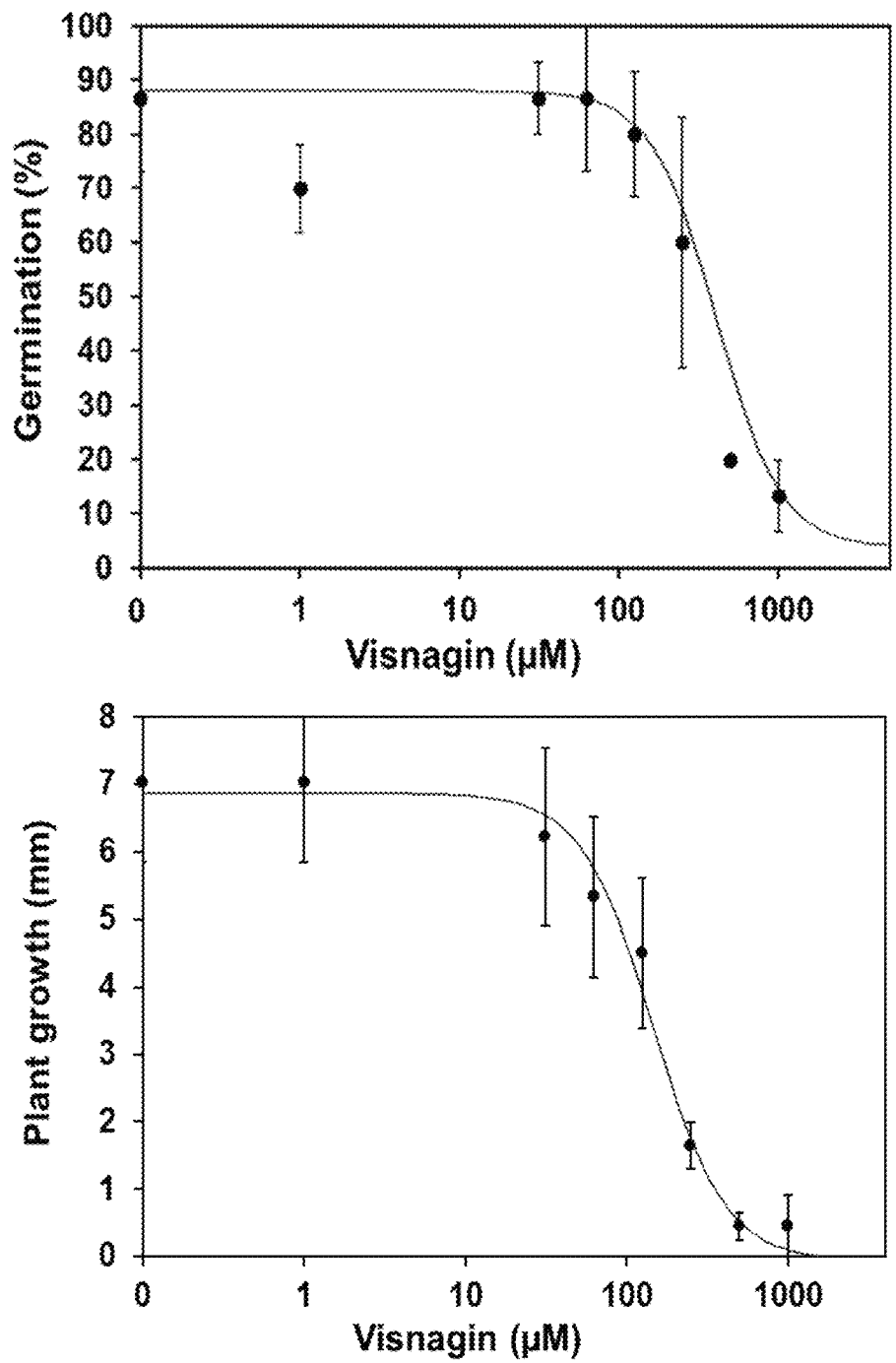
FIG. 2 (Continuation)

Khellin = left column ■ and visnagin = right column ☐
Dotted line: $H_2O_2$ (10mM)

Meristem cells of onion at 7 days after exposure to different treatments:

(1-2) Control (wash -).
(3-4) Control (wash +).
(5-7) compound III (100 µM).
(8-10) compound III (100 µM wash +).
(11) compound IV (100 µM).
(12-16) compound IV (100 µM wash +).

P: prophase, M: metaphase, A: anaphase, T: telophase, CA: chromosomal aberrations, MN: micronuclei and NA: nuclear abnormality.

HERBICIDAL COMPOSITION COMPRISING CHROMONE DERIVATIVES AND A METHOD FOR WEED CONTROL

FIELD OF THE INVENTION

The present invention refers to herbicidal compositions comprising chromone derivatives and a method for weed control.

BACKGROUND OF THE INVENTION

Every year billions of tons of agricultural production are lost due to weeds. Nowadays, the most important method used for managing them is chemical control. Since its appearance in the 50s it has been increasingly used, especially with the adoption of herbicide-resistant crops. This process has also been accompanied by a change in tillage techniques causing changes on weeds ecology. The use of herbicide doses lower than recommended, together with the absence of crops rotation and the repetitive use of the same active ingredients have triggered the appearance of herbicide-resistant weeds. Currently, these weed species constitute one of the most important problems associated with agriculture.

Furthermore, organic farmers also have difficulties regarding weed control, since there are no highly effective products available in the market.

There is an evident necessity for new molecules that serve as leads for the development of herbicides. Plant natural products provide an attractive alternative in finding effective and environmentally safe phytotoxic compounds, with high structural diversity and novel modes of action.

Plants have evolved physical and chemical mechanisms of defense that allowed them to survive attacks from predators and compete against other plant species. Particularly, plant chemical defense consists of a diverse group of organic compounds forming a protective barrier, known as natural products or secondary metabolites. These compounds are not directly involved in plant growth and development and often occur in limited taxa.

Research on natural products has been promoted because of the discovery of their numerous biological properties. This process has been accompanied by an increase in studies aimed at finding and identifying new molecules possessing pharmacological, agronomic or industrial interest from plants.

The study of phytotoxic or herbicidal plant compounds is expanding. Recently, this phenomenon has taken relevance at an ecological level, because it may explain plant growth inhibition in plant-plant interactions and during vegetal communities' struturation. Also, this would be a mechanism used by invasive plants to replace native plant species.

With regard the pesticide uses of the species *Ammi visnaga* (L.) Lam., alcoholic and aqueous extracts and essential oil of this plant have insecticidal properties on different insect species.[1-9] Also, previous work on the allelopathic potential of *A. visnaga* crude extracts reported some phytotoxicity toward legumes and maize and toward weeds associated with wheat cultivation.[10-11] However, the compounds responsible for the phytotoxicity of the crude extracts were not isolated and identified. By phytotoxicity-guided fractionation of an extract of *A. visnaga* our group was able to isolate the furanochromones, khellin and visnagin, for which herbicidal activity had not been described before. These furanochromones have been previously isolated from *A. visnaga*, and different medicinal properties and biological activities have been described for them[9,12-20] nevertheless, the phytotoxic or herbicidal activities of pure khellin and visnagin have not been reported before.

There is an unsatisfied need for new products for weed control with novel modes of action that are safer for the environment and effective enough to be used in organic farming. This makes plant natural products exploration an attractive strategy. Such compounds may be formulated and directly used as herbicides, or used as lead structures for the development of new products by chemical modifications.

BRIEF DESCRIPTION OF THE INVENTION

Considering the above, the present inventors have surprisingly found after a prolonged research and evaluation of a number of plant extracts that 1-benzopyran-4-one, also referred to as chromone, and a specific group of derivatives thereof have a strong herbicidal effect.

Particularly, and as a way of non-limiting examples, furanochromones 4,9-dimethoxy-7-methyl-5H-furo[3,2-g]chromen-5-one (khellin) and 4-methoxy-7-methyl-5H-furo[3,2-g]chromen-5-one (visnagin) naturally occurring in plants, were highly phytotoxic to model species lettuce (*Lactuca sativa*) and duckweed (*Lemna paucicostata*). These compounds, also inhibited the growth and germination of a diverse group of weeds that included five grasses [ryegrass (*Lolium* sp.), barnyardgrass (*Echinocloa crusgalli*), crabgrass (*Digitaria sanguinalis*), foxtail (*Setaria italica*), and millet (*Panicum* sp.)] and two broadleaf species [morningglory (*Ipomea* sp.) and velvetleaf (*Abutilon theophrasti*)] during laboratory bioassays. The most active was visnagin, which showed a non-selective herbicidal effect on different weeds, grasses and broadleaf species. It exhibited contact post-emergence herbicidal activity.

Also, analogs including 1-benzopyran-4-one and a specific group of derivatives showed phytotoxicity on lettuce (*Lactuca sativa*) and creeping bentgrass (*Agrostis stolonifera*).

Therefore, it is a first aspect of the present invention an herbicidal composition comprising a compound of Formula I:

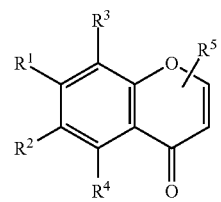

I where $R^1$ and $R^2$ are H or taken together with the carbon atoms to which they are attached form a furane ring; $R^3$ and $R^4$ each independently represent H, —OH or —O—($C_1$-$C_4$) alkyl; and $R^5$ is H, ($C_1$-$C_4$) alkyl, —($C_1$-$C_2$) alkylene-O-glucoside or —COOH; and an agriculturally acceptable vehicle.

In an embodiment of the present invention, the composition comprises two or more compounds of Formula I and an agriculturally acceptable vehicle.

In preferred embodiments of the present invention, ($C_1$-$C_4$) alkyl in any of $R^3$, $R^4$ and $R^5$ is —$CH_3$ or —$CH_2CH_3$.

In another preferred embodiment of the present invention ($C_1$-$C_2$) alkylene in $R^5$ is —$CH_2$—.

In a most preferred embodiment of the present invention, (C$_1$-C$_4$) alkyl in any of R$^3$, R$^4$ and R$^5$ is —CH$_3$.

In an embodiment of the present invention, the compound of Formula I is 1-benzopyran-4-one (chromone) of Formula II:

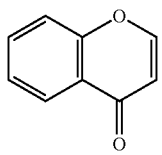

II

In another embodiment of the present invention, the compound of Formula I is 4,9-dimethoxy-7-methyl-5H-furo[3,2-g]chromen-5-one (Khellin) of Formula III:

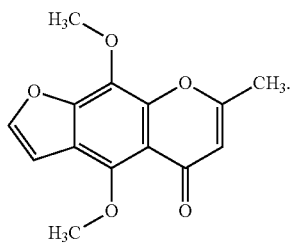

III

In another embodiment of the present invention, the compound of Formula I is 4-methoxy-7-methyl-5H-furo[3,2-g]chromen-5-one (Visnagin) of Formula IV:

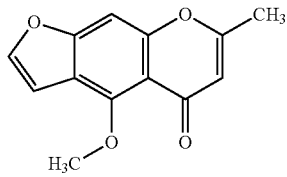

IV

In another embodiment of the present invention, the compound of Formula I is Khellol-glucoside (Khelloside) of Formula V:

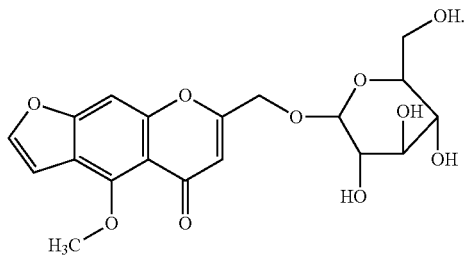

V

In another embodiment of the present invention, the compound of Formula I is 4,9-dimethoxy-5-oxo-5H-furo[3,2-g]chromen-7-carboxilic acid of Formula VI:

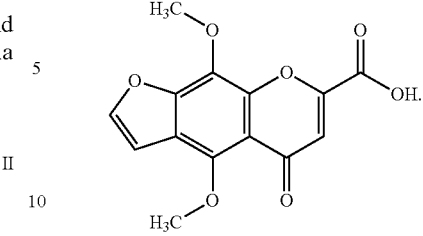

VI

In another embodiment of the present invention, the compound of Formula I is 4-hydroxy-9-methoxy-7-methyl-5H-furo[3,2-g]chromen-5-one of Formula VII:

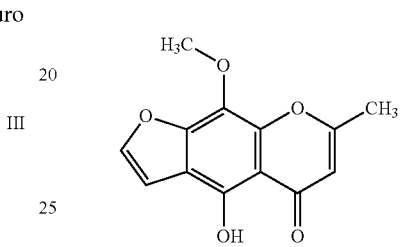

VII

In another embodiment of the present invention, the compound of Formula I is 4,9-dihydroxy-7-methyl-5H-furo[3,2-g]chromen-5-one of Formula VIII:

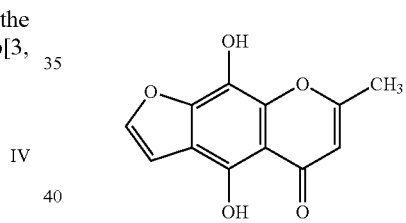

VIII

In a preferred embodiment of the invention, the agricultural acceptable vehicle comprises at least one ingredient selected from the group comprising solid and liquid diluents or carriers, surfactants, pH buffers, stabilizing agents, preservatives, coloring agents, wetting agents, dispersants, emulsifiers and defoaming agents.

In yet a preferred embodiment of the invention, the compound of Formula I is in a concentration range of 1 to 90% w/v.

A second aspect of the present invention is a method of controlling weeds comprising the step of applying one or more compounds of Formula I above to a locus in need of weed control.

In a preferred embodiment of this second aspect of the invention, the compounds of Formula I are selected from the group of 1-benzopyran-4-one; 4,9-dimethoxy-7-methyl-5H-furo[3,2-g]chromen-5-one; 4-methoxy-7-methyl-5H-furo[3,2-g]chromen-5-one; Khellol-glucoside; 4,9-dimethoxy-5-oxo-5H-furo[3,2-g]chromen-7-carboxilic acid; 4-hydroxy-9-methoxy-7-methyl-5H-furo[3,2-g]chromen-5-one; and 4,9-dihydroxy-7-methyl-5H-furo[3,2-g]chromen-5-one; or mixtures thereof and a vehicle agriculturally acceptable, to a locus in need of weed control.

In another preferred embodiment of this second aspect of the invention, the compound of Formula I is applied at a dose of 2-20 kg active ingredient (ai)/ha, more preferably at a dose of 2-8 kg ai/ha and most preferably at a dose of 2-4 kg ai/ha.

According to a preferred embodiment of the invention, the compound of Formula I is applied at a dose of 8 kg ai/ha.

A third aspect of the present invention is the use of compounds of Formula I

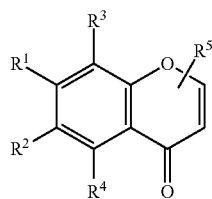

where $R^1$ and $R^2$ are H or taken together with the carbon atoms to which they are attached form a furane ring; $R^3$ and $R^4$ each independently represent H, —OH or —O—($C_1$-$C_4$) alkyl; and $R^5$ is H, ($C_1$-$C_4$) alkyl, —($C_1$-$C_2$) alkylene-O-glucoside or —COOH; and an agriculturally acceptable vehicle, for controlling weeds in a locus in need thereof.

DETAILED DESCRIPTION OF THE INVENTION

Figure 1:
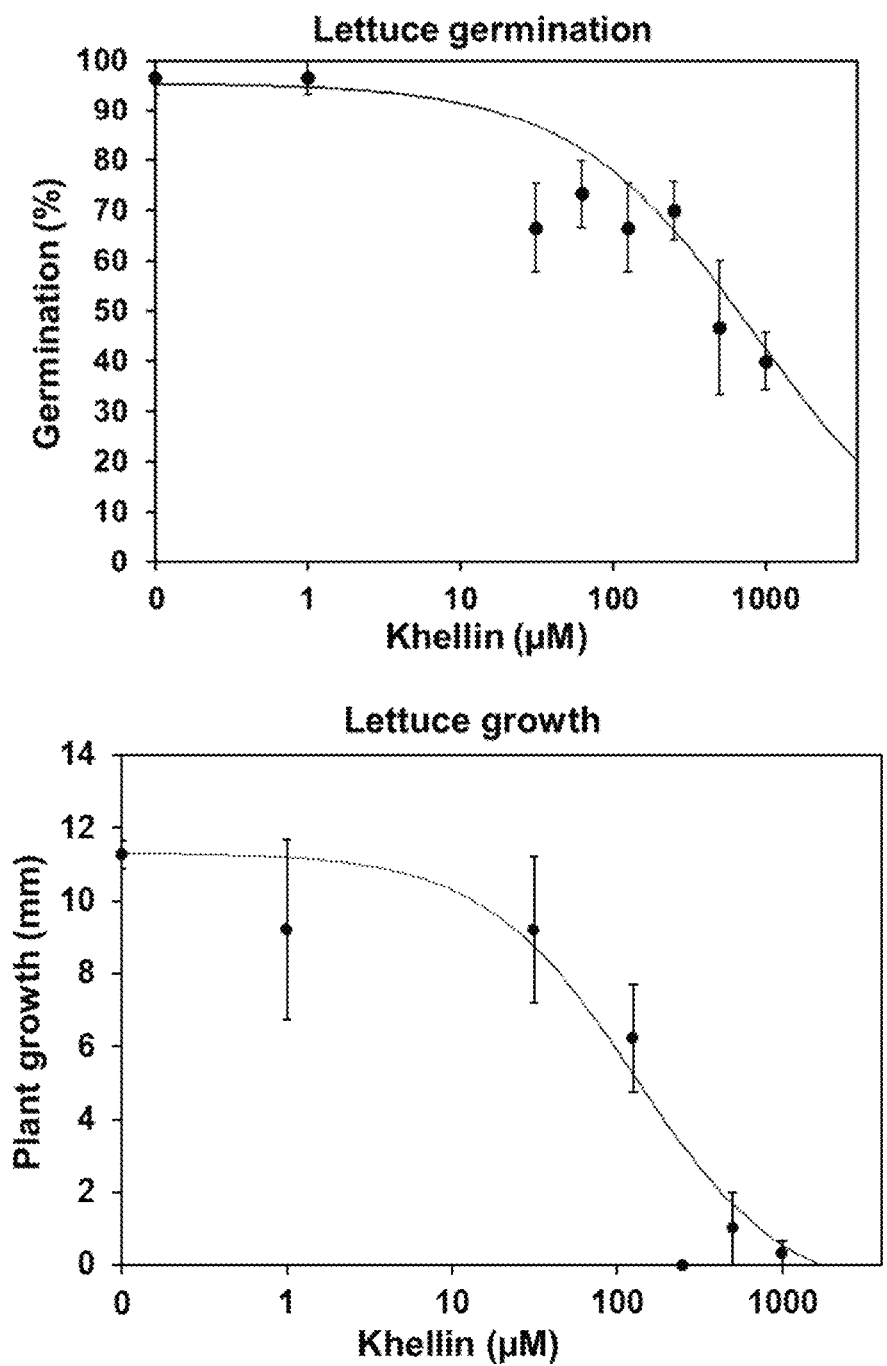
FIG. 1. Dose-response curves of khellin and visnagin on lettuce (*Lactuca sativa*). The percentage of germination and length of plants were determined at 7 days. Data represents means of three replicates±SD.

Preferred features of the present invention will now be described with particular reference to the accompanying drawings. However, it is to be understood that the features illustrated in and described with reference to the drawings are not to be construed as limiting on the scope of the invention. The invention is not limited to the disclosed embodiments. Variations to the disclosed embodiments can be understood and effected by those skilled in the art in practicing the claimed disclosure, from a study of the drawings, the disclosure and the appended claims.

In general, terms and phrases used in the present application, and variations thereof, including the appended claims, unless otherwise expressly stated, should be construed as open ended. Thus, the term "including" should be read to mean "including without limitation", "including but not limited to", or the like; the term "comprising" as used herein is synonymous with "including" or "containing" and is open-ended and does not exclude additional, unrecited elements or method steps; the term "example" is used to provide exemplary instances of the item in discussion, not an exhaustive or limiting list thereof; use of terms like "preferably", "preferred", is merely intended to highlight alternative or additional features that may or may not be utilized in a particular embodiment of the invention. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise.

For the purposes of the present specification, the terms "control" or "controlling" in relation to weeds are intended to mean weed growth inhibition, weed eradication, weed germination inhibition and/or weed killing.

The composition or formulation of the invention comprises the active compound of Formula I described above with an agricultural acceptable vehicle, where the vehicle consist of at least one additional component selected from the group comprising solid and liquid diluents that serve as a carrier, surfactants, stabilizing agents, preservatives, coloring agents, wetting agents, dispersants, emulsifiers or defoaming agents and other components well known to a person skilled in the art. The formulation components are selected to be consistent with the physical properties of the active ingredient, the application methods and relevant environmental factors such as kind of crop to be protected, soil characteristics, moisture and temperature. The compounds of Formula I may be formulated in both liquid and solid compositions.

Compositions in liquid form include solutions, suspensions, emulsions (including microemulsions), flowable concentrates, emulsifiable concentrates, gels and the like. Suitable liquid carriers for liquid compositions include, for example, water; N,N-dimethylformamide; N-methylpyrrolidone; saturated, unsaturated, linear, branched or cyclic alcohols, like methanol, ethanol, n-propanol, isopropyl alcohol, n-butanol, isobutyl alcohol, n-hexanol, 2-ethylhexanol, n-octanol, decanol, isodecyl alcohol, fatty alcohols and ciclohexanol; dimethyl sulfoxide; alkyl phosphates; (poly)ethylene glycols; (poly)propylene glycols; propylene carbonate; (iso)paraffins; aromatic hydrocarbons like alkylbenzenes or alkylnaphthalenes; glycerine; sorbitol; ketones such as cyclohexanone or 2-heptanone; acetic acid esters; other esters such as benzoic acid esters and y-butyrolactone; vegetable oils like soybean oil, castor oil, olive oil, sesame oil, corn oil, peanut oil, linseed oil, sunflower oil, safflower oil, cottonseed oil, rapeseed oil, coconut oil and grapeseed oil; animal fats/oils and mixtures thereof.

Aqueous liquid compositions are preferred, but non-aqueous liquid compositions are also suitable and effective embodiments of the invention.

Compositions in solid form may be soluble, dispersible or emulsifiable in water. They are preferably powders, granules, tablets, pellets, pills, pastilles, and the like, which can optionally be coated with a film-making material, like a polymeric material, for controlled or delayed release of active compounds. Suitable solid carriers include, for example, talc, cellulose, starch, dextrin, bentonite, montmorillonite, attapulgite, kaolin and other suitable clays, gypsum, titanium dioxide, zinc oxide, sugars like lactose and sucrose, silica, mica, diatomaceous earth and calcium carbonate.

The compositions of the invention may also be in the form of a sprayable formulation, i.e. a formulation ready-to-spray by any suitable means or a formulation that may be readily diluted in water or any other suitable medium like hydrocarbons or vegetable oils prior to be sprayed.

Suitable surfactants that may be used in the compositions of the invention include, anionic, cationic or nonionic surfactants and mixtures thereof.

Anionic surfactants that may be included in the compositions of the present invention comprise: alkylaryl sulfonic acids and salts thereof; aryl sulfonic acids and salts thereof; alcohol alcoxylates and esters thereof; alkylphenol ethoxylates; lignosulfonates; olefin sulfonates; protein-based surfactants; oil/fatty acid sulfates and sulfonates; sulfates and sulfonates of ethoxylated alkylphenols; alcohol sulfates; ethoxylated alcohol sulfates; sulfonates of amines and amides such as N,N-alkyltaurates; sulfonates of fractionated petroleum; and sulfosuccinates.

Cationic surfactants that may be included in the compositions of the present invention comprise: amines, amides and ethoxylated amines or amides; amine oxides; alkoxylated amines; amine salts; quaternary ammonium salts, and alkoxylated quaternary ammonium salts.

Nonionic surfactants that may be included in the compositions of the present invention comprise: alcohol alkoxylates; amine ethoxylates; alkoxylated vegetable oils; alkanolamides and alkoxylated alkanolamides; alkylphenol alkoxylates; ethoxylated fatty acids; fatty acid esters; alkoxylated fatty esters and oils; glycerol esters, lanolin derivatives, polyalkoxylate esters; sorbitan; polymeric surfactants; polyethylene glycols; polyethylene glycol fatty acid esters; silicone surfactants; alkyl polyglycosides and alkyl polysaccharides.

Formulation additives and/or auxiliaries that may be included in the compositions of the present invention comprise: buffers; suspending agents; antifoaming agents; viscosity modification agents; antifreezing agents; antimicrobials; coloring agents; evaporation retardants; and film formers like polyvinyl acetates, polyvinyl alcohols, and waxes.

A typical method for preparing the compositions of the present invention is by mixing or blending the ingredients together, e.g. for liquid compositions. Solid compositions usually require dry or wet milling processes. The compounds of Formula I may also be coated on granules of an inert carrier by spraying processes and in case of preparing, controlled release formulations, particles containing the compounds of Formula I may be coated with a suitable polymeric material.

The compositions of the invention are effective for controlling weeds in agronomic crop areas, and for generally controlling plant growth in areas like airports, parking lots, fuel storage tanks, industrial facilities, river banks, irrigation and other waterways, around highway and railroad structures.

The compounds of Formula I are effective for controlling weeds associated to the crop culture of corn (maize), sorghum, soybeans, wheat, alfalfa, barley, cotton, rape, rice, oats, vegetables, tomato, potato, coffee, cocoa, oil palm, sugarcane, citrus, grapes, fruit trees, nut trees, banana, hops, tea and forests such as eucalyptus and conifers, turf species and in genetically engineered crops.

The compositions of the invention can be usefully applied by a variety of methods involving contacting a herbicidally effective amount of a compound of the invention, or a composition comprising said compound and at least one of a surfactant, a solid diluent or a liquid diluent, to the foliage or other part of the undesired vegetation or to the environment of the undesired vegetation such as the soil or water in which the undesired vegetation is growing or which surrounds the seed or other propagule of the undesired vegetation.

Depending upon the type of formulation selected, the kind of weed to be controlled, the application method, among other considerations, a herbicidally effective amount of the compounds of Formula I is about 2 to 20 kg ai/ha with a preferred range of about 2 to 8 kg ai/ha, more preferably about 2 to 4 kg ai/ha. In a preferred embodiment, the compounds of Formula I are present in a concentration of 8 kg ai/ha. One skilled in the art can easily determine the effective amount necessary for the desired level of weed control. The compositions of the invention can be directly applied to a plant or a part thereof, particularly of the undesired weed, and/or to the growth medium in contact with the plant.

The compositions of the present invention may comprise one or more other active compounds including fungicides, insecticides, other herbicides, herbicide safeners, nematocides, acaricides, bactericides, growth regulators, insect repellents or attractants, pheromones, crop nutrients, in order to increase the crop protection span.

The compositions of invention may comprise one or more herbicides further to the Compounds of Formula I, e.g. acetochlor, acifluorfen and salts and esters thereof, aclonifen, acrolein, alachlor, alloxydim, ametryn, amicarbazone, amidosulfuron, aminopyralid, amitrole, ammonium sulfamate, anilofos, asulam, atrazine, beflubutamid, benazolin, benazolin-ethyl, bencarbazone, benfluralin, bensulfuron-methyl, bensulide, bentazone, benzobicyclon, benzofenap, bifenox, bilanafos, bispyribac and salts thereof, bromacil, bromobutide, bromofenoxim, bromoxynil, bromoxynil octanoate, butachlor, butafenacil, butamifos, butralin, butylate, cafenstrole, carbetamide, carfentrazone-ethyl, catechin, chlomethoxyfen, chlorbromuron, chloridazon, chlorimuron-ethyl, chiorotoluron, chlorpropham, chlorsulfuron, cinidon-ethyl, cinmethylin, cinosulfuron, clethodim, clodinafop-propargyl, clomazone, clomeprop, clopyralid, cumyluron, cyanazine, cycloate, cyclopyrimorate, cyclosulfamuron, cycloxydim, cyhalofop-butyl, 2,4-D and esters and salts thereof, daimuron, dazomet, 2,4-DB and salts thereof, desmedipham, desmetryn, dicamba and salts thereof, dichlobenil, dichlorprop, diclofop-methyl, diclosulam, difenzoquat metilsulfate, diflufenican, diflufenzopyr, dimefuron, dimethachlor, dimethametryn, dimethipin, dimethylarsinic acid and its sodium salt, dinitramine, dinoterb, diphenamid, diquat dibromide, dithiopyr, diuron, esprocarb, ethalfluralin, ethametsulfuron-methyl, ethiozin, ethofumesate, ethoxyfen, ethoxysulfuron, etobenzanid, fenoxaprop-ethyl, fenoxaprop-P-ethyl, fenoxasulfone, fenuron, fenuron-TCA, flamprop and esters thereof, flazasulfuron, florasulam, fluazifop and esters thereof fluazolate, flucarbazone, flucetosulfuron, fluchloralin, flufenacet, flufenpyr, flufenpyrethyl, flumetsulam, flumioxazin, fluometuron, fluoroglycofen-ethyl, flupoxam, flupyrsulfuron and salts and esters thereof, flurenol, flurenol-butyl, fluridone, flurochloridone, fluroxypyr, flurtamone, fluthiacet-methyl, fomesafen, foramsulfuron, fosamine-ammonium, glufosinate, glufosinate-ammonium, glufosinate-P, glyphosate and salts thereof, halauxifen, halauxifen-methyl, halosulfuron-methyl, haloxyfop-etotyl, haloxyfop-methyl, imazamox, imazapic, imazapyr, imazaquin and salts thereof, imazethapyr and salts thereof, imazosulfuron, indanofan, indaziflam, iofensulfuron, ioxynil and salts and esters thereof, ipfencarbazone, isoproturon, isouron, isoxaben, isoxaflutole, isoxachlortole, lactofen, lenacil, linuron, maleic hydrazide, MCPA and salts and esters thereof, MCPB and salts and esters thereof mesosulfuron-methyl, mesotrione, metam-sodium, metamifop, metamitron, metazachlor, metazosulfuron, methabenzthiazuron, methylarsonic acid and salts thereof, methyldymron, metobenzuron, metobromuron, metolachlor, S-metolachlor, metosulam, metoxuron, metribuzin, metsulfuron-methyl, molinate, monolinuron, naproanilide, napropamide, neburon, nicosulfuron, norflurazon, orbencarb, oryzalin, oxadiazon, oxasulfuron, oxaziclomefone, oxyfluorfen, paraquat dichloride, pendimethalin, penoxsulam, pentanochlor, pentoxazone, perfluidonephenmedipham, picloram and salts thereof, picolinafen, pinoxaden, piperophos, pretilachlor, primisulfuron-methyl, prodiamine, profoxydim, prometon, prometryn, propachlor, propanil, propaquizafop, propazine, propoxycarbazone, propyrisulfuron, propyzamide, prosulfocarb, prosulfuron, pyraclonil, pyrazogyl, pyrazolynate, pyrazoxyfen, pyrazosulfuron-ethyl, pyribenzoxim, pyributicarb, pyridate, pyriftalid, pyrimisulfan, pyrithiobac and salts thereof, pyroxasulfone, pyroxsulam, quinclorac, quinmerac, quinoclamine, quizalofop and esters thereof, rimsulfuron, saflufenacil, sethoxydim, siduron, simazine, simetryn, sulcotrione, sulfentrazone, sulfometuron-methyl, sulfosulfuron, 2,3,6-TBA, tebutam, tebuthiuron, tefuryltrione, terbumeton, terbuthylazine, terbutryn, thenylchlor, thiazopyr, thiencarbazone, thifensulfuron-methyl, thiobencarb, tiafenacil, tiocarbazil, topramezone, triallate, triafamone, triasulfuron, triaziflam, tribenuron-methyl, triclopyr and salts and esters thereof, triclopyr-butotyl, triclopyr-triethylammonium, tridiphane, trietazine, trifloxysulfuron, trifluralin, triflusulfuron-methyl, bioherbicides such as *Alternaria destruens* Simmons, *Colletotrichum gloeosporiodes* (Penz.) Penz. & Sacc., *Drechsiera monoceras* (MTB-951), *Myrothecium verrucaria* (Albertini & Schweinitz) Ditmar: Fries, *Phytophthora palmivora* (Butl.) Butl. and *Puccinia thlaspeos* Schub.

The compositions of the present invention can also include or be used in combination with plant growth regulators such as aviglycine, epocholeone, gibberellic acid, gibberellin A4 and A7, mepiquat chloride, prohexadione calcium, sodium nitrophenolate and trinexapac-methyl, and organisms such as *Bacillus cereus* strain BP01.

The compounds of Formula I can also be used in combination with herbicide safeners such as allidochlor, benoxacor, cumyluron, cyometrinil, cyprosulfonamide, daimuron, dichlormid, dimepiperate, fenchlorazole-ethyl, fenclorim, flurazole, fluxofenim, furilazole, mephenate, methoxyphenone naphthalic anhydride (1,8-naphthalic anhydride), oxabetrinil, 1-bromo-4-[(chloromethyl)sulfonyl]benzene (BCS), 4-(dichloroacetyl)-1-oxa-4-azospiro[4.5]decane (MON 4660), 2-(dichloromethyl)-2-methyl-1,3-dioxolane (MG 191), to increase safety to certain crops. Therefore the compositions of the invention may comprise an effective amount of a herbicide safener along with one or more Compounds of Formula I The compositions of the invention will be now described in more detail by means of the following Examples that should not be construed as limiting the scope of the invention.

EXAMPLES

Obtaining Compounds and Preparing Compositions

Extraction Procedure

Ground dried flowers of *A. visnaga* (39 g) were extracted with dichloromethane (DCM) two times (24 h each one) at 25° C. followed by Buchner funnel filtration and concentration under reduced pressure in a rotary evaporator. This procedure provided 1.74 g of DCM extract.

Bioassay-Guided Fractionation

DCM extract of flowers of *A. visnaga* (1.6 g) was divided in two 800 mg halves and each one was subjected to column chromatography using an Isolera One system (Biotage), equipped with UV detector (302 and 365 nm) and automatic fraction collector. Separation was performed by normal-phase chromatography column using a SNAP Cartridge KP-Sil (37×157 mm, 50 μm irregular silica, 100 g, Biotage) and a pre-packaged SNAP Samplet Cartridge KP-Sil (37×17 mm, Biotage). A full gradient of hexane:ethyl acetate was used for elution, from 100:0 to 0:100 over 3000 ml. Flow was 40 ml/min and 25 ml fractions were collected. Equal fractions were combined based on similarities on their TLC and chromatogram profiles providing nineteen fractions named I to XIX. All fractions were evaluated for their phytotoxicity on germination bioassay of lettuce (*L. sativa*) and creeping bentgrass (*A. stolonifera*). Fractions XIV and XVII showed the highest level of phytotoxic activity. Those fractions completely inhibited lettuce and creeping bentgrass germination at 1 mg/mL.

Chemical Analysis for Phytotoxic Compounds Identification

Fractions XIV and XVII, were analyzed by GC/MSD. The GC was equipped with a DB-5 fused silica capillary column (30 m×0.25 mm, film thickness of 0.25 μm) operated using the following conditions: injector temperature, 240° C.; column temperature, 60-240° C. at 3° C./min then held at 240° C. for 5 min; carrier gas, He; injection volume, 1 μL (splitless). The MS mass range was from 40 to 650 m/z, a filament delay of 3 min, target TIC of 20000, to prescan ionization of 100 μs, an ion-trap temperature of 150° C., a manifold temperature of 60° C., and a transfer line temperature of 170° C. Mass spectra registered were compared with mass spectra NIST 11 database.

$^1$H- and $^{13}$C-NMR spectra were recorded in $CDCl_3$ on a Bruker 500 MHz spectrometer.

High-resolution mass (ESI-MS) spectra of isolated compounds in MeOH were acquired by direct injection of 20 μl of sample (approximately 1 mg/ml) in a JEOL USA, Inc. (Peabody, Mass. 01960-3862) AccuTOF (JMS-T100LC).

Fraction XIV was pure khellin, i.e. compound of Formula III: High resolution ESI-MS m/z 521.14458 $[2M+H]^+$ calculated for $C_{28}H_{25}O_{10}$ 521.14477, mass difference (mmu)

−0.19; m/z 543.12622 [2M+Na]⁺ calculated for $C_{28}H_{24}NaO_{10}$ 543.12672, mass difference (mmu) −0.5. ¹H-NMR (in CDCl₃) δ (ppm) 7.55, 6.92, 5.96, 4.09, 3.96, 2.30 in agreement with published values.[15] ¹³H-NMR (in CDCl₃) δ (ppm) 145.35, 104.95, 147.09, 178.02, 110.38, 163.84, 129.66, 148.6, 119.15, 113.44, 146.86, 61.27, 62.09, 19.8 in agreement with published values.[15,21]

Khellin with Numbers Indicating Each Carbon:

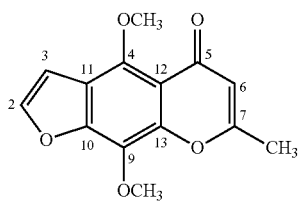 [SMILES: COc1c2occc2c(OC)c2c(=O)cc(C)oc12]

Fraction XVII was pure visnagin, i.e. compound of Formula IV: High resolution ESI-MS m/z 231.06653 [M+H]⁺ calculated for $C_{13}H_{11}O_4$ 231.06573 mass difference (mmu) 0.8; 461.12647 [2M+H]⁺ calculated for $C_{26}H_{21}O_8$ 461.12364, mass difference (mmu) 2.83; m/z 483.11048 [2M+Na]⁺ calculated for $C_{26}H_{20}NaO_8$ 483.10559, mass difference (mmu) 4.89. ¹H-NMR (in CDCl₃) δ (ppm) 7.49, 6.92, 5.93, 7.09, 4.07, 2.21 in agreement with published values.[22] ¹³H-NMR (in CDCl₃) δ (ppm) 144.94, 105.07, 157.51, 177.98, 110.53, 163.68, 94.87, 153.25, 116.67, 112.09, 155.67, 61.49, 19.72 in agreement with published values.[21,22]

Visnagin with Numbers Indicating Each Carbon:

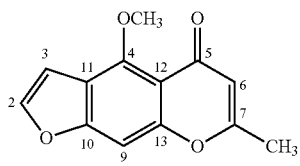 [SMILES: COc1c2ccoc2cc2oc(C)cc(=O)c12]

Experimental Results

Example 1

Germination Bioassays with Lettuce (*L. Sativa*), Creeping Bentgrass (*A. Stolonifera*) and Ryegrass (*Lolium Multiflorum*) Using Pure Compounds A filter paper and 5 lettuce or 10 mg of creeping bentgrass seeds were placed in each well of a 24-well plate. Stock solutions (10×) of test compounds were prepared in acetone. 180 μl of distilled water were added to each well together with 20 μl of stock solution or acetone in solvent control. Final concentration of acetone was 10% v/v. Plates were sealed with Parafilm, and incubated at 26° C. in a growth chamber set at 173 μmol m⁻² s⁻¹ continuous photosynthetically active radiation. Phytotoxic activity was qualitatively evaluated by visually comparing germination in each well with solvent control at 7 days. A qualitative estimation of phytotoxicity was obtained by using a rating scale of 0 to 5, where 0 was no effect, and 5 was no germination of seeds. This procedure was also used for testing the phytotoxicity of pure compounds on ryegrass. On this experiment 12-well plates were used. 10 seeds were placed per well and final volume was 300 μl in each one. During dose-response bioassays used for $IC_{50}$ determination, germination percentage and length of plants were measured at 7 days in order to determine the concentration required for 50% germination and growth inhibition ($IC_{50}$). All experiments were done in triplicate.

Compounds of Formula III and IV above were tested on lettuce and creeping bentgrass germination. Using 1 mg/mL of each compound germination inhibition was 100% at day 7.

Example 2

Dose-Response Bioassays with Lettuce and Ryegrass

Using method described in Example 1, compounds of Formula III and IV above were tested against lettuce and ryegrass.

Figure 2:
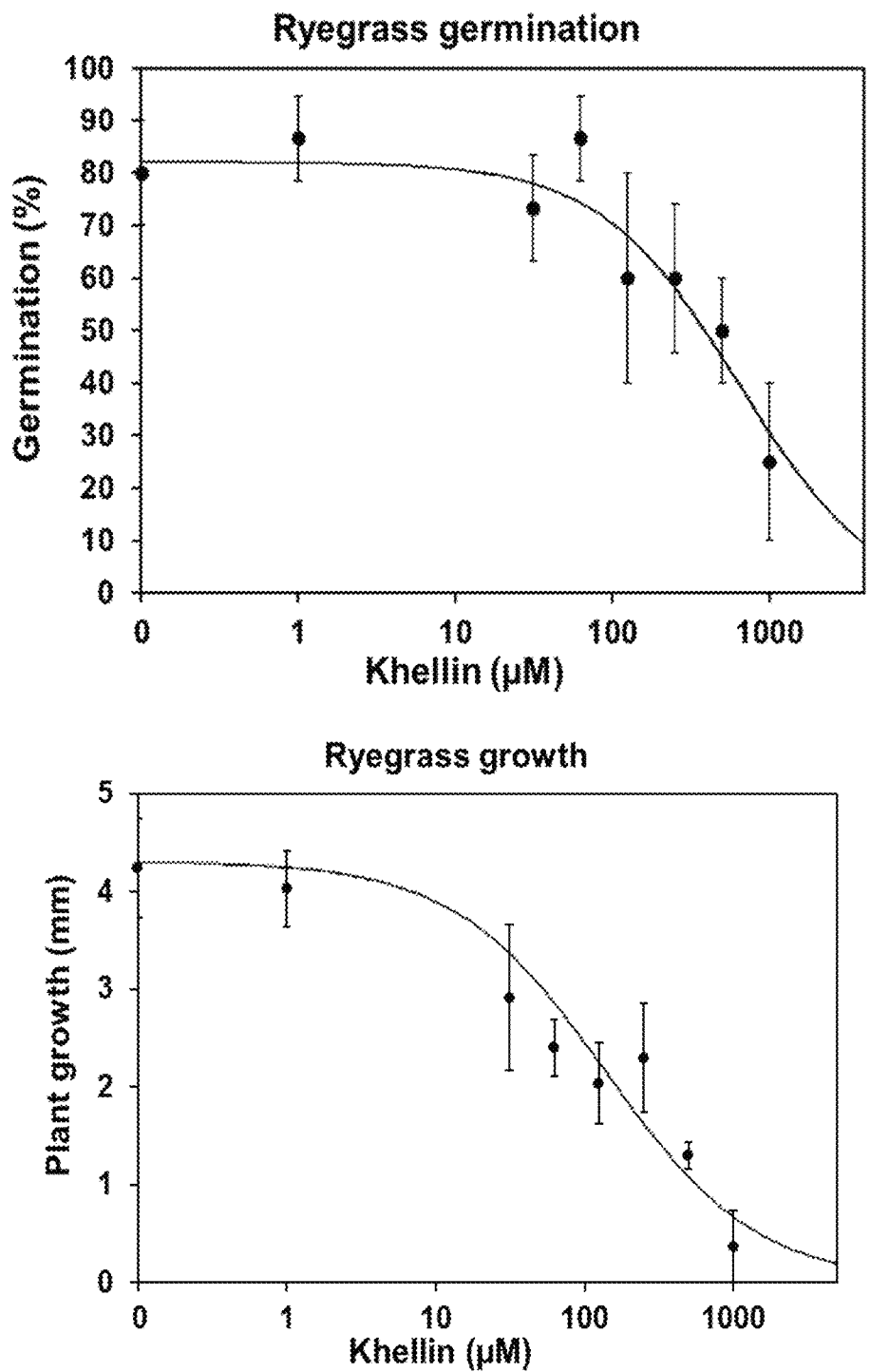
FIG. 2. Dose-response curves of khellin and visnagin on ryegrass (*Lolium multiflorum*). The percentage of germination and length of plants were determined at 7 days. Data represents means of three replicates±SD.

Dose-response curves of the mentioned compounds on lettuce (*L. sativa*) and ryegrass (*L. multiflorum*) are shown in FIGS. 1 and 2, respectively. The percentage of germination and length of plants were determined at 7 days. Data represents means of three replicates±SD. The $IC_{50}$ values, for both germination and growth inhibition by compounds III and IV on lettuce and ryegrass, were obtained from estimated parameters in the regression curves. These values are shown in Tables 1 and 2 below.

TABLE 1

Phytotoxic effect on Lettuce

| Compound | $IC_{50}(\mu M) \pm SE$ to inhibit germination | $IC_{50}(\mu M) \pm SE$ to inhibit growth |
| --- | --- | --- |
| Formula III | 701 ± 93 | 110 ± 11 |
| Formula IV | 740 ± 98 | 175 ± 16 |

TABLE 2

Phytotoxic effect on Ryegrass

| Compound | $IC_{50}(\mu M) \pm SE$ to inhibit germination | $IC_{50}(\mu M) \pm SE$ to inhibit growth |
| --- | --- | --- |
| Formula III | 637 ± 112 | 244 ± 37 |
| Formula IV | 502 ± 115 | 214 ± 23 |

Example 3

Dose-Response Bioassay with Duckweed *Lemna Paucicostata* (L.) Hegelm

Phytotoxic activity of compounds of formula III and IV above as evaluated on duckweed. Duckweed stocks were grown from a single colony consisting of a mother and two daughter fronds in a beaker on modified Hoagland media (Table 3 below). The medium was adjusted to pH 5.5 with 1 M NaOH and filtered through a 0.2 μm filter. Each well of non-pyrogenic polystyrene sterile 6-well plates was filled with 4.950 ml of Hoagland media and, 50 μl of distilled water, 50 μl of acetone in solvent control or 50 μl of acetone containing the appropriate concentration of test compound. The final concentration of acetone was 1% v/v. Two, three-frond colonies from 4 to 5 d-old stock cultures were placed in each well. Plates were placed in an incubator with white light (94.2 µE m$^{-2}$ s$^{-1}$). Total frond area per well was recorded by the Scanalyzer (LemnaTec, Germany) image analysis system from days 0 to 7. Percentage of increase between days 1 and 7 was determined relative to baseline area at day zero.

TABLE 3

Modified Hoagland media.

| Components | Concentration (mg/L) |
| --- | --- |
| KNO$_3$ | 1.515 |
| KH$_2$PO$_4$ | 680 |
| MgSO$_4$•7H$_2$O | 492 |
| Na$_2$CO$_3$ | 20 |
| Ca(NO$_3$)$_2$•4H$_2$O | 1.18 |
| H$_3$BO$_3$ | 0.05 |
| ZnSO$_4$ | 0.05 |
| Na$_2$MoO$_4$ | 0.12 |
| MnCl$_2$ | 0.47 |
| CoCl$_2$ | 0.025 |
| CuSO$_4$•5H$_2$O | 0.025 |
| Fe-EDTA | 18.355 |

Figure 3:
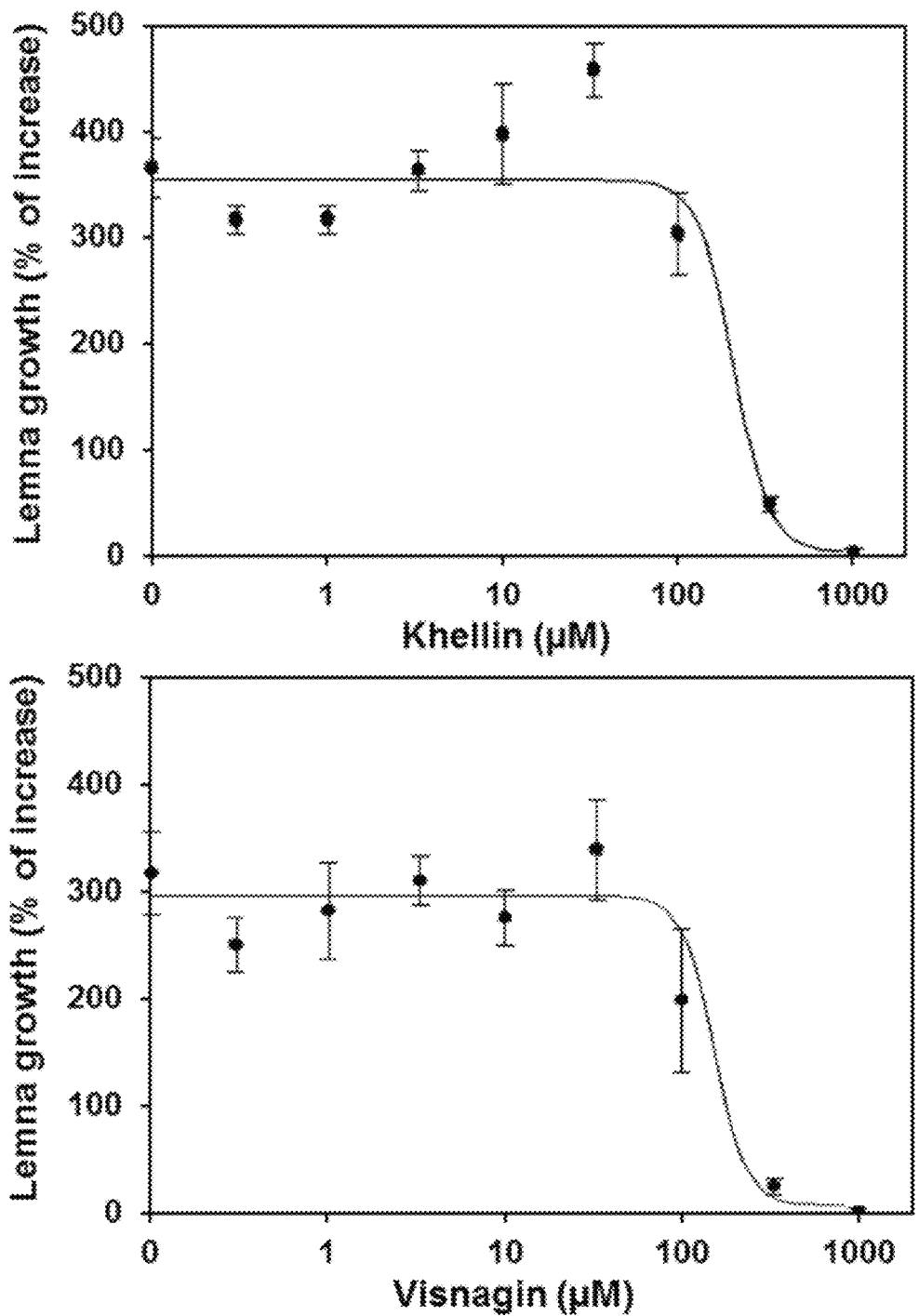
FIG. 3. Dose-response curves of khellin and visnagin on duckweed (*Lemna paucicostata*). Percentage of increase between days 1 and 7 was determined relative to baseline area at day zero. Data represents means of three replicates±SD.

Dose-response curves of compounds III and IV on duckweed (*L. paucicostata*) are shown in FIG. 3. Percentage of increase between days 1 and 7 was determined relative to baseline area at day zero. Data represents means of three replicates±SD.

The IC$_{50}$ values for duckweed growth inhibition by the tested compounds were obtained from estimated parameters in the regression curves and are detailed in Table 4 below:

TABLE 4

Duckweed growth inhibition.

| Compound | IC$_{50}$ (µM) ± SE |
| --- | --- |
| Formula III | 162 ± 29 |
| Formula IV | 122 ± 28 |

Figure 4A:
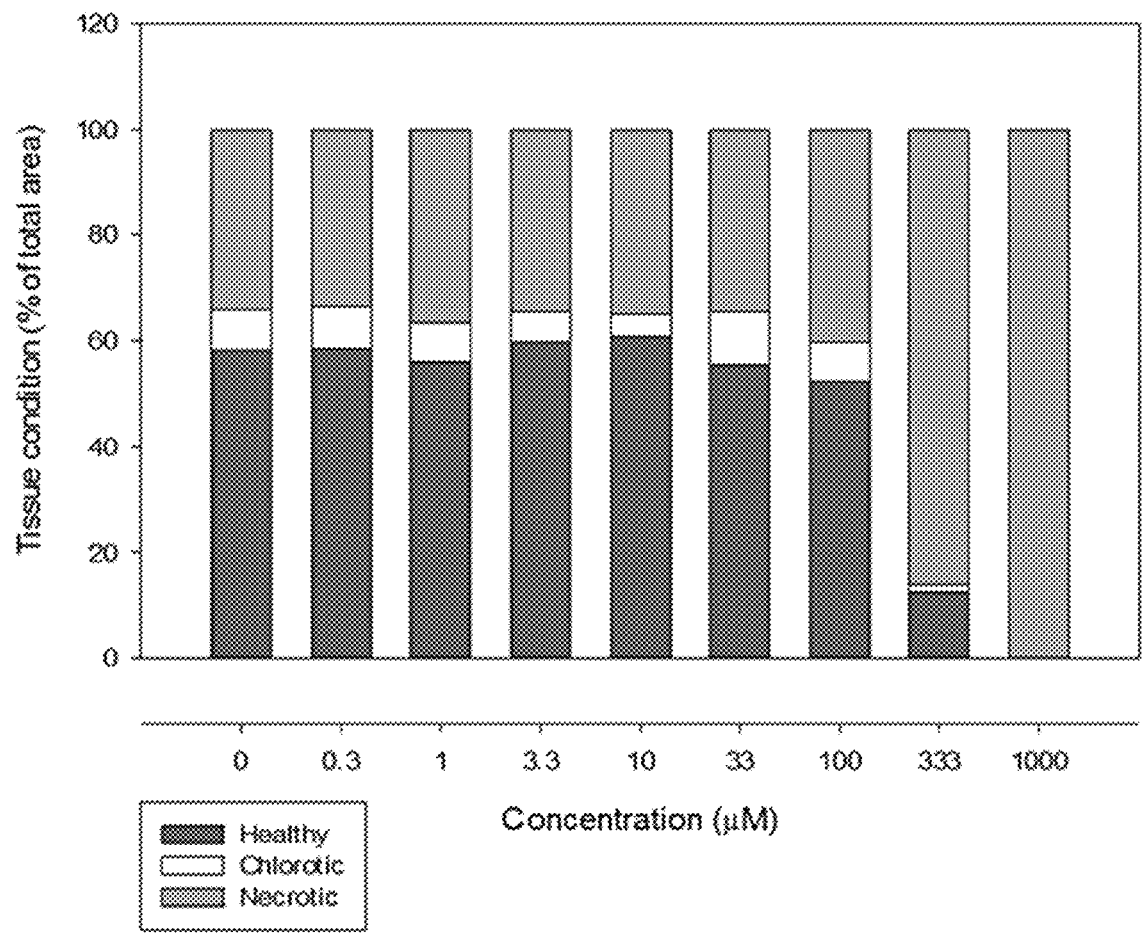
FIGS. 4(A and B) shows the tissue condition of duckweed at day 7, after treatment with compounds of Formulas III and IV. Column portions: Top=Necrotic; Mid=Chlorotic; and Bottom=Healthy.
Figure 4B:
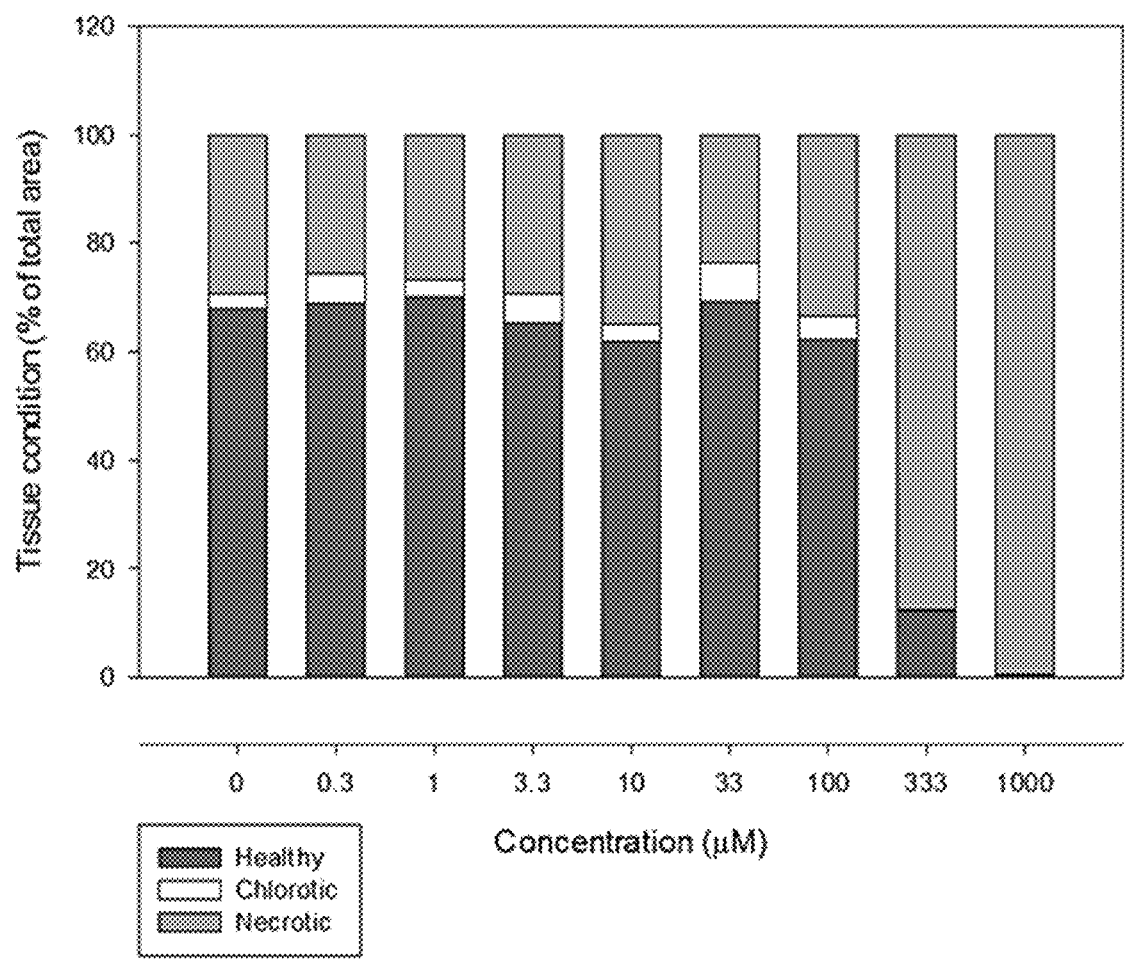

FIGS. 4(A and B) shows the tissue condition of duckweed at day 7, after treatment with compounds of Formulas III and IV at different concentrations. Tissue condition is assessed as % of total area as being healthy, chlorotic or necrotic.

Example 4

Postemergence Bioassay with Lettuce in Petri Dishes

Compounds of formula III and IV above were tested at different concentrations in a postemergence bioassay (in Petri dishes) against lettuce. Lettuce seeds were pre-incubated in Petri dishes with a filter paper and water for 2 days. After that, seedlings (15 mm approx.) were moved to a new Petri dish containing 4 mL of an aqueous solution of each compound or commercial herbicide. Plants length was measured at day 6 (4 days after postemergence application of the compounds). The results were compared to those obtained with acetochlor and glyphosate.

TABLE 5

Growth inhibition of compounds of Formulas III and IV compared to acetochlor and glyphosate

| Compound concentration (mM) | Average growth inhibition (%) as percentage of control |
| --- | --- |
| 0.50 | 22 |
| 1.00 | 85 |
| 1.50 | 91 |
| 0.54 (Acetochlor) | 60 |
| 0.75 (Glyphosate) | 45 |

Figure 5:
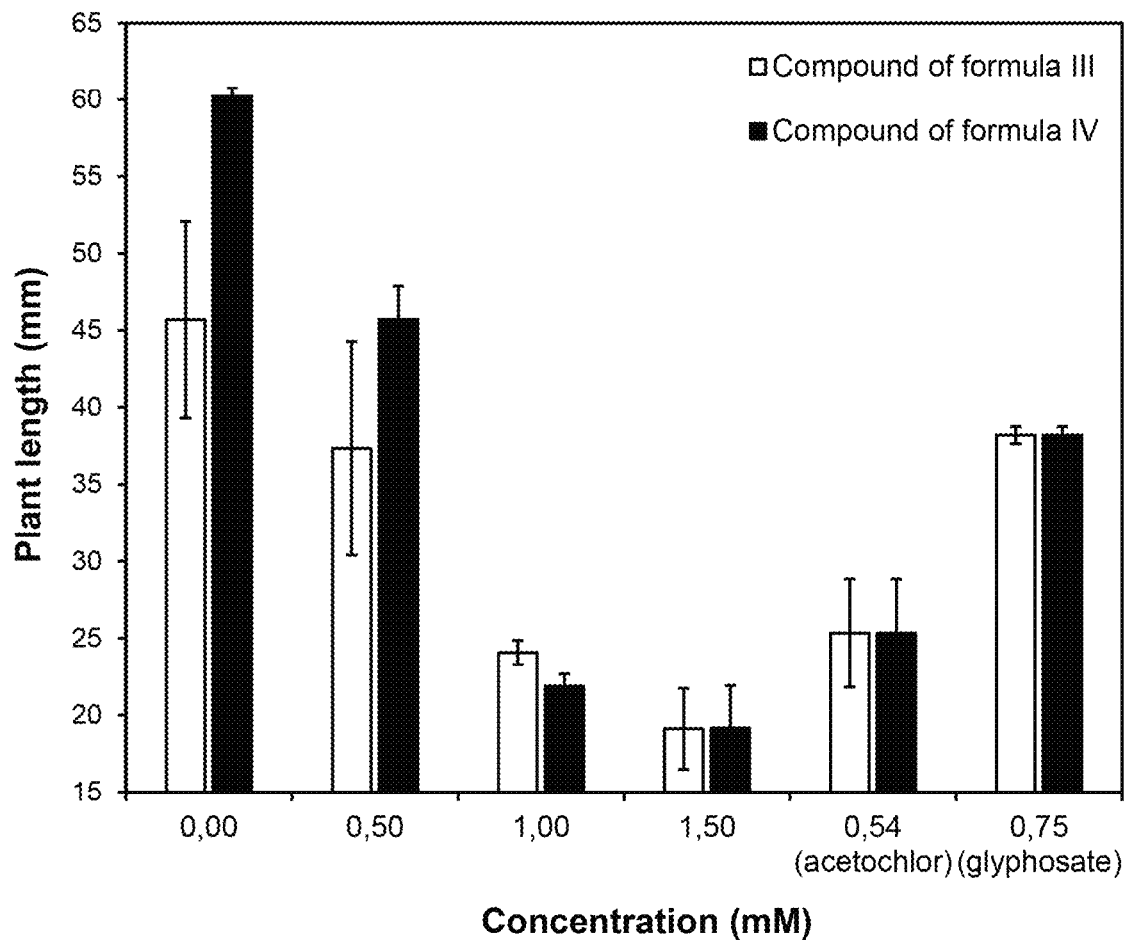
FIG. 5. Lettuce growth at 6 days (4 days of treatment) after postemergence treatment with compounds of Formulas III and IV compared to acetochlor and glyphosate.

FIG. 5 shows the plant lengths at 6 days, for compounds of Formulas III and IV compared to acetochlor and glyphosate. Plant length's axis starts in 15 mm because seeds were pre-incubated in water, so all seedlings were around 15 mm long at the beginning of the treatment.

Example 5

Extended Postemergence Bioassay with Lettuce (in Petri Dishes) Compared to Acetochlor The length of plants were measured at days 6 and 12 (4 and 10 days after application of the compounds).

Figure 6:
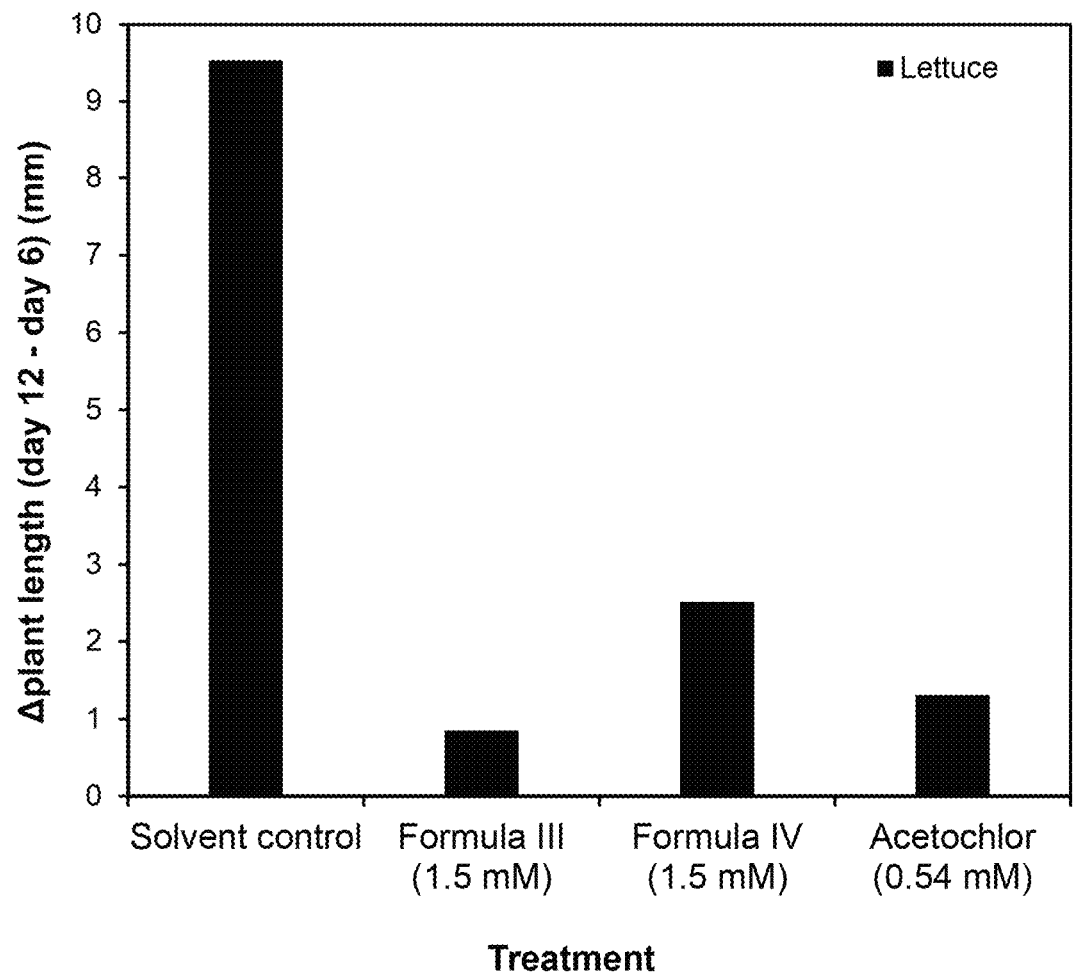
FIG. 6. Shows the difference in plant length after different treatments.

FIG. 6 shows the difference in plant length as ΔPlant length (mm):

$$\Delta \text{Plant length (mm)} = \text{Plant length (mm)}_{day\ 12} - \text{Plant length (mm)}_{day\ 6}$$

Example 6

Postemergence Bioassay with Ryegrass (in Petri Dishes) Compared to Acetochlor and Glyphosate Plant length was measured at day 6 (4 days after application of the compounds)

TABLE 6

Inhibition of the growth of ryegrass by compounds of Formulas III and IV compared to Acetochlor and Glyphosate

| Treatment | Growth inhibition (%) as percentage of control |
| --- | --- |
| Formula III (500 µM) | 25 |
| Formula IV (500 µM) | 66 |
| Acetochlor (540 µM) | 97 |
| Glyphosate (750 µM) | 75 |

Figure 7:
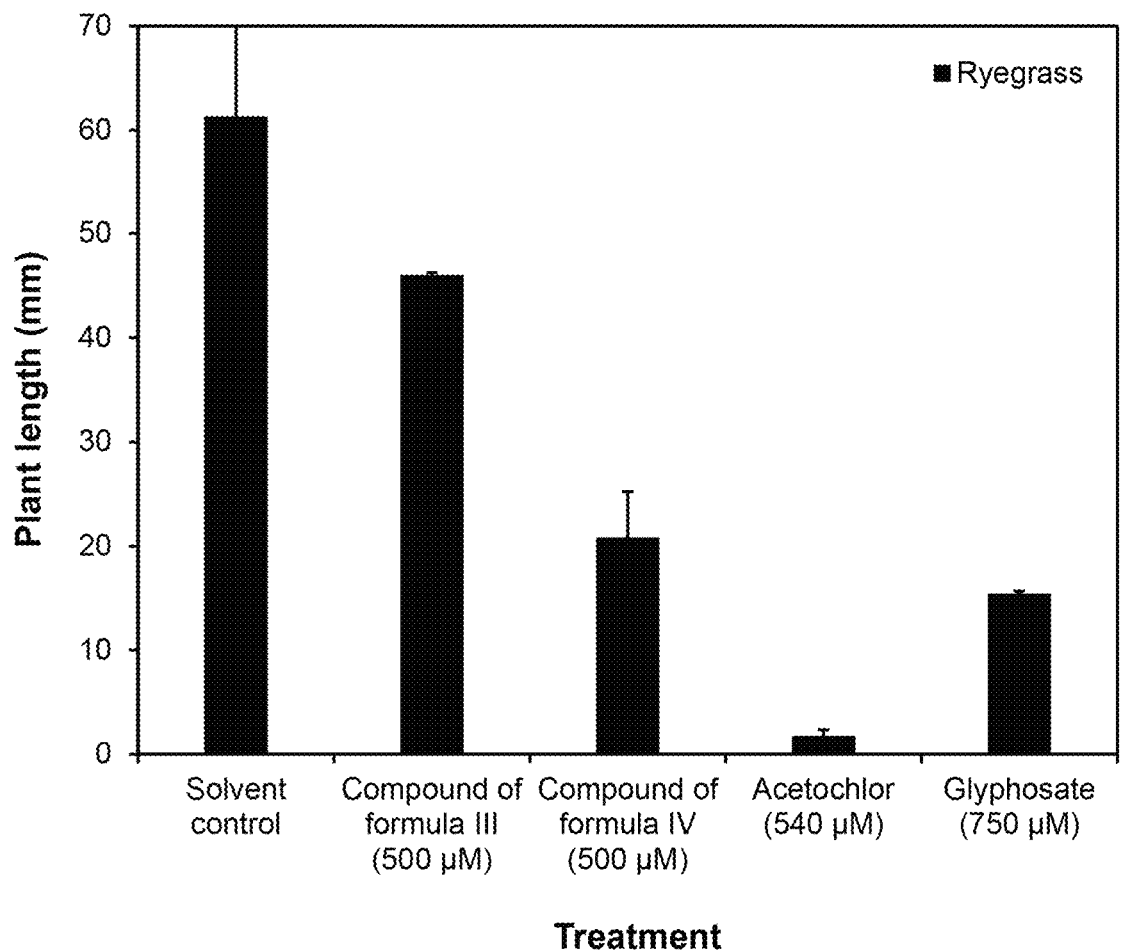
FIG. 7. Ryegrass growth at 6 days (4 days of treatment) after postemergence treatment with compounds of Formulas III and IV compared to acetochlor and glyphosate.

FIG. 7 shows plant length measured at 6 days. Plant length's axis starts in 5 mm because seeds were pre-incubated in water, so all seedlings were around 5 mm long at the beginning of the treatment.

Example 7

Pre-Emergence Bioassay (in Petri Dishes) Against Different Weeds: Morningglory (*Ipomea* Sp.), Velvetleaf (*Abutilon Theophrasti*), Barnyardgrass (*Echinochloa Crus-Galli*), Foxtail (*Setaria Italica*), Millet (*Panicum* Sp.) and Crabgrass (*Digitaria Sanguinalis*)

Compounds of Formulas III and IV above were tested in a pre-emergence bioassay (in Petri dishes) against different weeds at 0.5 and 1.0 mM. The seeds of different weeds were placed in Petri dishes with a filter paper and 4 mL of an aqueous solution of each compound or commercial herbicide.

Plant length was measured at 7 days of incubation.

Figure 8:
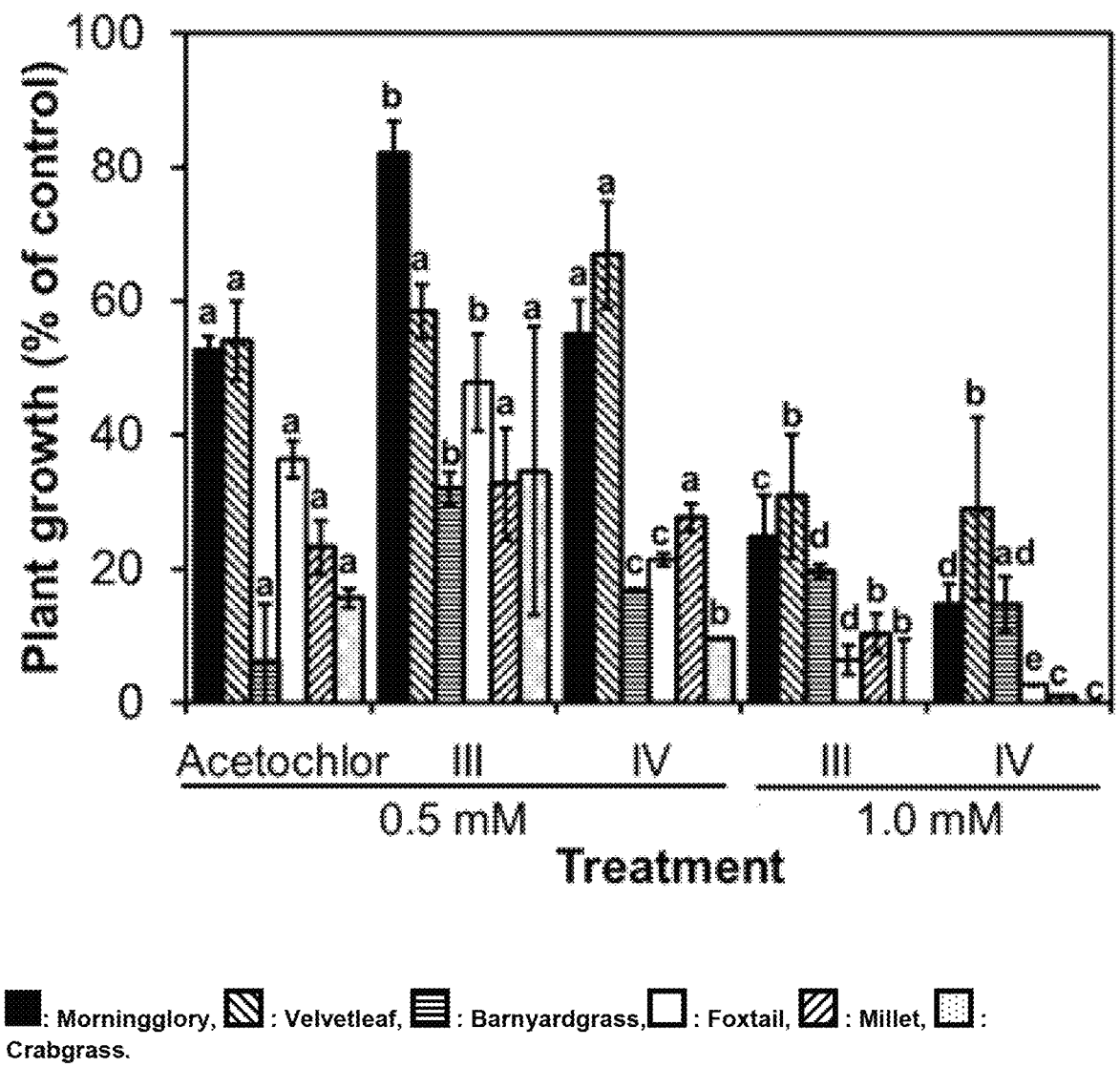
FIG. 8 shows the effects of pre-emergence treatments with compounds of formulas III and IV on weeds growth at 7 days compared to acetochlor. ■: Morningglory, ▨: Velvetleaf, ▦: Barnyardgrass, □: Foxtail, ▨: Millet, ▨: Crabgrass. Each data point represents the mean of three experiments±SD. Different letters above the bars indicate significant differences among treatments (p<0.05).

FIG. 8 shows the pre-emergence effect on weeds growth of compounds of formulas III and IV compared to acetochlor.

Figure 9:
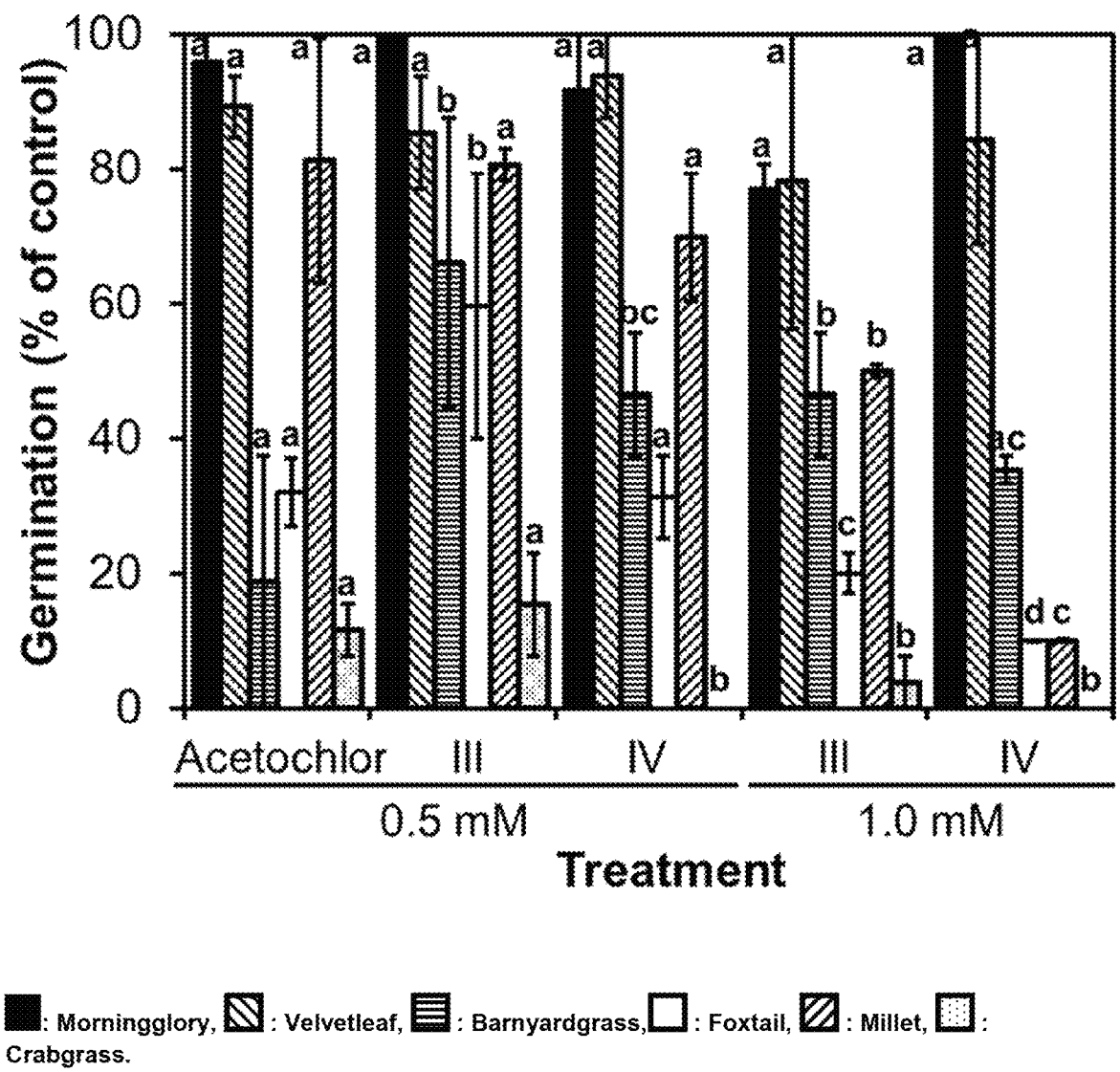
FIG. 9 shows the effects of pre-emergence treatments with compounds of formulas III and IV on weeds germination at 7 days compared to acetochlor. ■: Morningglory, ▨: Velvetleaf, ▦: Barnyardgrass, □: Foxtail, ▨: Millet, ▨: Crabgrass. Each data point represents the mean of three experiments±SD. Different letters above the bars indicate significant differences among treatments (p<0.05).

FIG. 9 shows the pre-emergence effect on weeds germination of compounds of formulas III and IV compared to acetochlor.

In the graphs of the mentioned FIGS. 8 and 9 the different weeds tested are indicated as follows:

■: Morningglory, ◪: Velvetleaf, ▤: Barnyardgrass, ☐: Foxtail, ▨: Millet, ▥: Crabgrass.

Example 8

Assays in Greenhouse Spraying Compounds of Formulas III and IV on Different Weeds: Crabgrass (*D. Sanguinalis*) and Velvetleaf (*A. Theophrasti*)

Aqueous solutions containing commercial standards of pure compounds of formulas III and IV were prepared and sprayed on crabgrass (*D. sanguinalis*) and velvetleaf (*A. theophrasti*). For better dissolution of compounds in water Tween 20 (1% v/v) and acetone (1% v/v) were added to spray solution. For postemergence application 6-8-day-old plants were sprayed, and final rate of compounds was 2.0 kg active ingredient (ai) $ha^{-1}$. Plant height and dry weight were measured at 11 days after spray. Results were compared with atrazine at 1.0 kg ai $ha^{-1}$.

Necrosis symptoms were observed on leaves of both weed species (grass and broadleaf) after post-emergence spray of compounds of Formulas III and IV. Also, there was a significant reduction of plant size and biomass respect solvent control after treatment with compound of Formula IV.

Figure 10A:
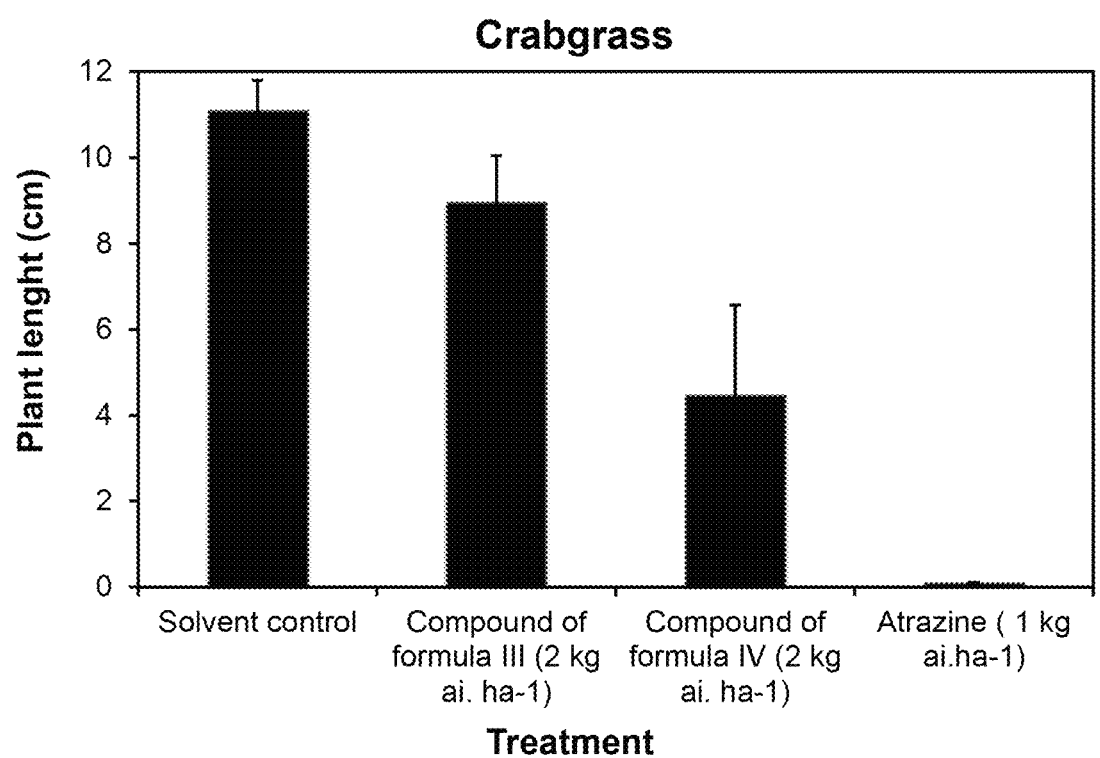
FIG. 10. Postemergence effects of compounds of Formulas III and IV compared to atrazine on the growth of crabgrass (A) and velvetleaf (B) during greenhouse assays at 11 days after treatment. Compounds of Formulas III and IV and atrazine were tested on 6-8-day-old plants. Data represent means of three replicates±SD.
Figure 10B:
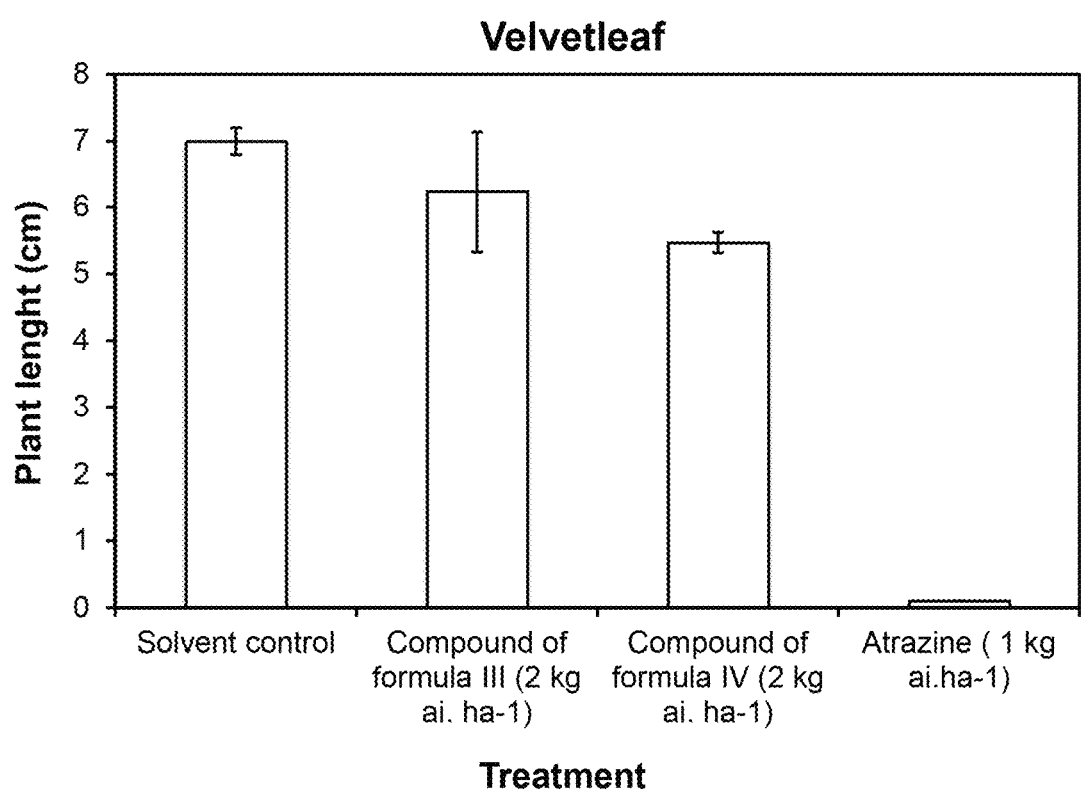

FIG. 10 shows the effect of compounds of Formulas III and IV on the growth of crabgrass (A) and velvetleaf (B) after postemergence application in greenhouse compared to atrazine.

Figure 11:
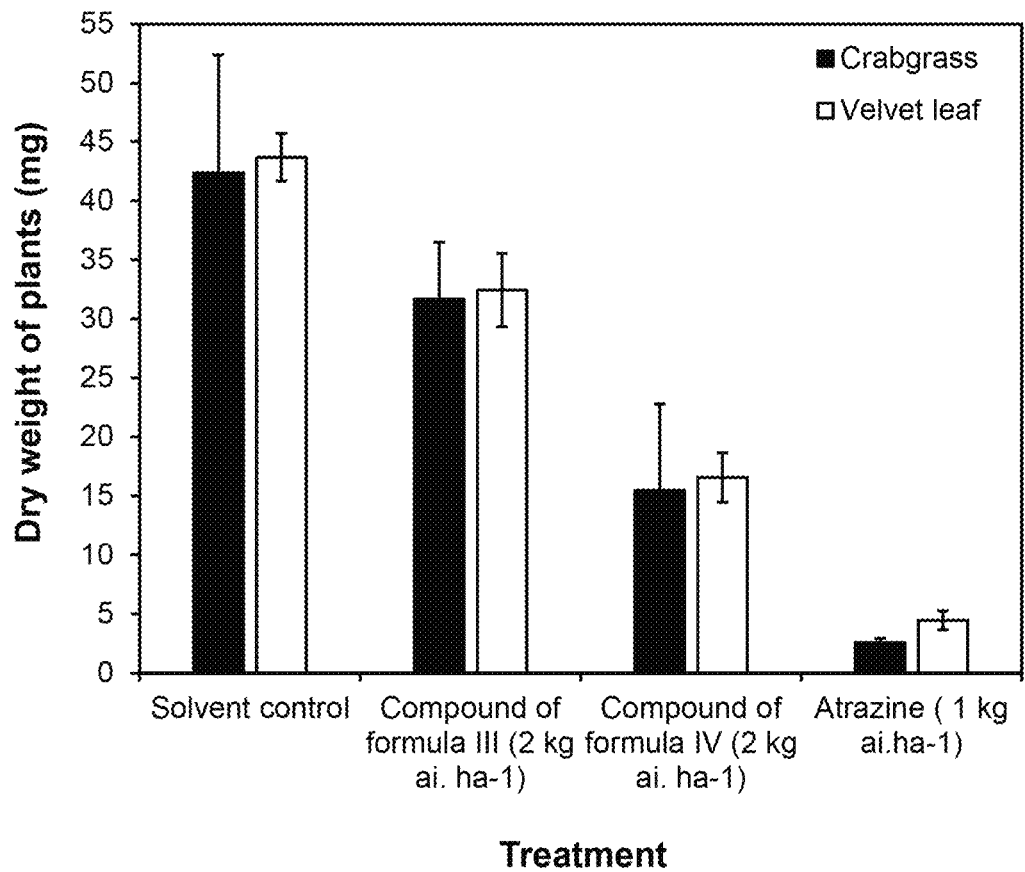
FIG. 11. Postemergence effects of compounds of Formulas III and IV compared to atrazine on weeds biomass during greenhouse assays at 11 days after treatment. Compounds of Formulas III and IV and atrazine were tested on 6-8-day-old plants. Data represent means of three replicates±SD. Left column (black)=Crabgrass; Right column (white)=Velvetleaf.

FIG. 11 shows the effect of compounds of Formulas III and IV on the biomass of both weeds (crabgrass and velvetleaf) after postemergence application in greenhouse compared to atrazine.

Example 9

Assays in Greenhouse Spraying Compound of Formula IV on Different Weeds: Crabgrass (*D. Sanguinalis*), Barnyardgrass (*E. Crus-Galli*) and Velvetleaf (*A. Theophrasti*)

Aqueous solution containing commercial standard of pure compound of Formula IV was prepared and sprayed on crabgrass (*D. sanguinalis*), barnyardgrass (*E. crus-galli*) and velvetleaf (*A. theophrasti*). Plants were sprayed at 2-3 true leaf stage (13-16-day-old plants). For better dissolution of compounds in water AGRIDEX (1% v/v) and acetone (1% v/v) were added to spray solutions. Final rate of compounds was 4.0 kg ai $ha^{-1}$. Plant height and dry weight were measured at 11 days after spray. Results were compared with the bio herbicide pelargonic acid at 4.0 kg ai $ha^{-1}$.

At 11 days after treatment, necrotic lesions and some abnormally formed leaves were observed on plants treated with compound of Formula IV. Results indicate that the postemergence herbicidal activity of compound of Formula IV is by contact and non-selective.

Weeds sprayed with compound of Formula IV were significantly smaller (height and biomass) than control plants. The herbicide effect caused by compound of Formula IV and pelargonic acid was similar in magnitude, there was not significant difference among them.

Figure 12:
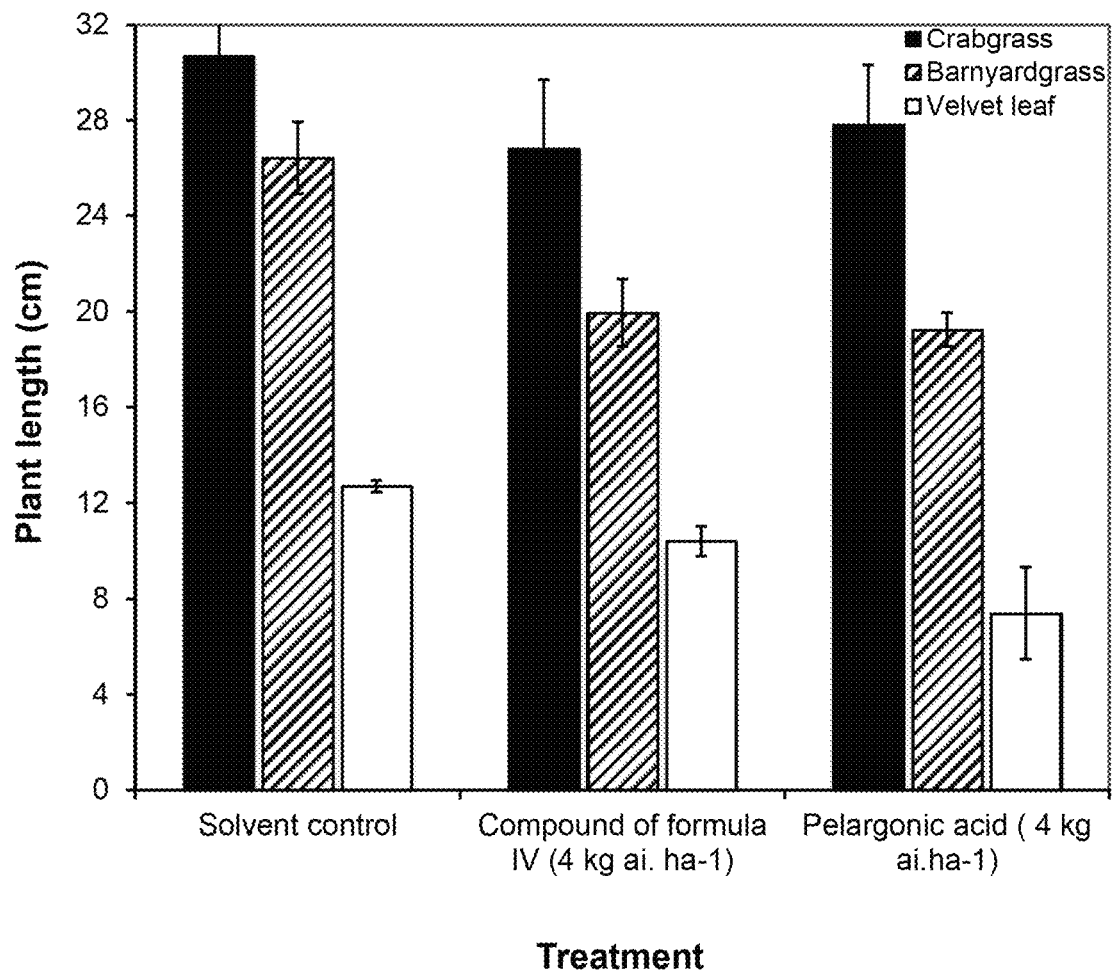
FIG. 12. Postemergence herbicidal effect of compound of Formula IV on the growth of three weeds compared to the bioherbicide pelargonic acid during a greenhouse assay. Plant height was measured at 11 days after treatment. Compound of Formula IV and pelargonic acid were tested on 13-16-day-old (2-3 true leaf stage) plants. Data represent means of three replicates±SD. Left column (black)=Crabgrass; Mid column (diagonal stripes)=Barnyardgrass; Right column (white)=Velvetleaf.

FIG. 12 shows the effect of compound of Formula IV on the growth of weeds after postemergence application in greenhouse compared to the bioherbicide pelargonic acid.

Figure 13:
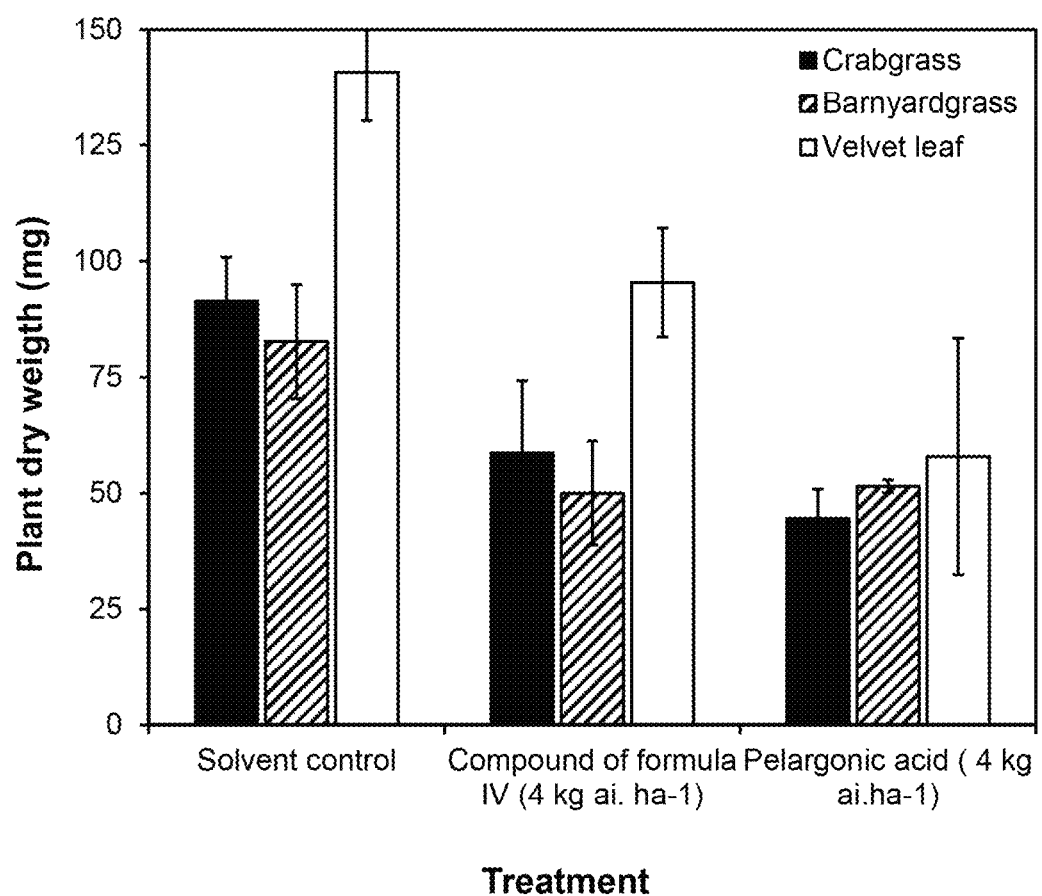
FIG. 13. Postemergence herbicidal effect of compound of Formula IV on three weeds compared to the bioherbicide pelargonic acid during greenhouse assays. The biomass (plant dry weight) was measured at 11 days after treatment. Compound of Formula IV and pelargonic acid were tested on 13-16-day-old (2-3 true leaf stage) plants. Data represent means of three replicates±SD. Left column (black)=Crabgrass; Mid column (diagonal stripes)=Barnyardgrass; Right column (white)=Velvetleaf.

FIG. 13 shows the effect of compound of Formula IV on the biomass of weeds after postemergence application in greenhouse compared to the bioherbicide pelargonic acid.

Table 7 summarizes the phytotoxic activity of chromone and some derivatives thereof in a bioassay on lettuce and creeping bentgrass.

TABLE 7

Phytotoxic activity of khellin, visnagin and other five derivatives commercially available. Phytotoxicity was evaluated at 7 days, in a bioassay done in 24-well plates.

| | Phytotoxicity at day 7[(*)] | |
|---|---|---|
| Compounds (1 mM) | Lettuce | Creeping bentgrass |
| Khellin (4,9-dimethoxy-7-methyl-5H-furo[3,2-g]chromen-5-one) | 3 | 5 |
| Visnagin (4-methoxy-7-methyl-5H-furo[3,2-g]chromen-5-one) | 3 | 5 |
| Khelloside (khellol-glucoside) | 1 | 2 |
| Chromone (1-benzopyran-4-one) | 3 | 4 |
| 4,9-dimethoxy-5-oxo-5H-furo[3,2-g]chromen-7-carboxilic acid | 3 | 3 |
| 4-hydroxy-9-methoxy-7-methyl-5H-furo[3,2-g]chromen-5-one | 2 | 1 |
| 4,9-dihydroxy-7-methyl-5H-furo[3,2-g]chromen-5-one | 3 | 1 |
| Solvent control | 0 | 0 |

[(*)]Bioassay rating based on scale of 0 to 5, 0 = no effect and 5 = no growth or germination.

Example 10

Phytotoxic Effect on Compounds of Formulas III and IV Under Different Conditions of Illumination Bioassays were carried out with lettuce in Petri dishes using the commercial standards of each compound. Lettuce seeds were incubated with 4 mL of an aqueous solution of compounds or acetochlor at 1 mM. Lettuce growth was measured at 7 days of incubation.

Figure 14:
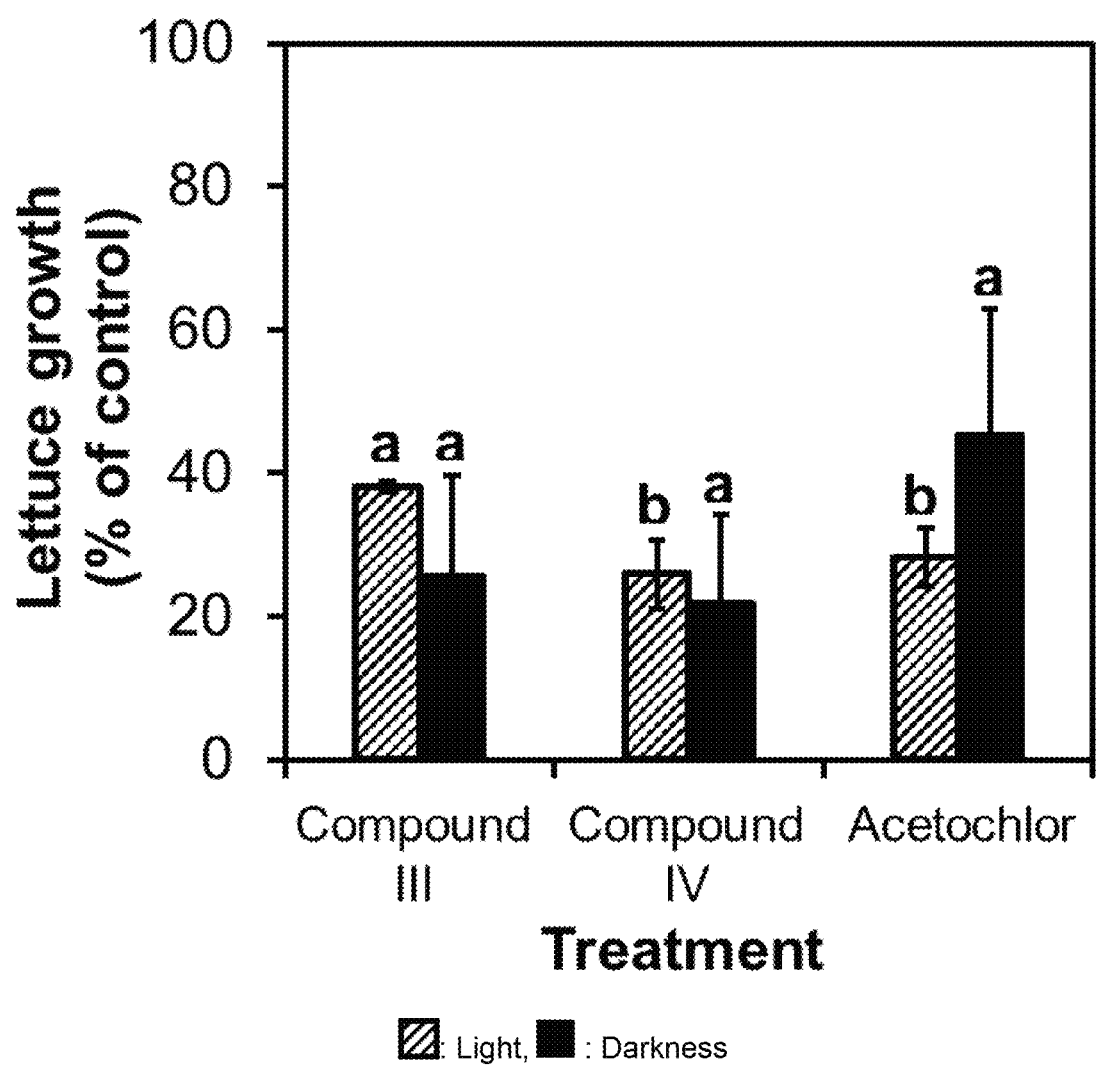
FIG. 14. Comparison of the phytotoxicities of compounds of formulas III and IV on lettuce under different conditions of illumination. Left column (diagonal stripes)=Light, and Right column (black)=Darkness. Acetochlor was included as reference of pre-emergent herbicide and to get the highest herbicidal effect, all compounds were tested at 1 mM. Data represent means of three replicates±SD. Different letters above the bars indicate significant differences between treatments (p<0.05).

The results of this test are shown in FIG. 14 where the Left column (diagonal stripes)=Light and the Right column (in black)=Darkness. Acetochlor was included as a reference of pre-emergent herbicide and to get the highest herbicidal effect, all compounds were tested at 1 mM. Data represent means of three replicates±SD. Different letters above the bars indicate significant differences between treatments (p<0.05). Results indicate that the phytotoxicity or herbicidal activity of compounds of formulas III and IV (khellin and visnagin, respectively) is not a light-dependent process.

The results of other experiments also suggest that the mode of action of these furanochromones is a process involving multiple targets.

Example 11

Electrolyte Leakage Assay

The effects of pure furanochromones, compounds of formulas III and IV (Sigma Aldrich), on membrane stability were studied as described by Dayan and Watson.[23] Cucumber cotyledon disks were exposed to each furanochromone at 100 and 300 μM. Control tissues were exposed to the same solvent as treated tissues but without the compounds. Conductivity measurements were carried out at the beginning of the dark incubation period, a second measurement was made after 16 h, at which time the samples were placed under high light intensity, and final measurements were made after 8 and 26 h of light exposure. Each experiment consisted of three replicates. Maximum conductivity was measured by boiling three samples of each treatment for 20 min. To study if electrolyte leakage caused by compounds of formulas III and IV was light-dependent, two sets of Petri plates were prepared with cucumber cotyledon disks exposed to test compounds and control in both. One set was treated as described before (dark 16 h/light 26 h) while the other one was kept in darkness for 42 h. Conductivity measurements were done at the indicated times.

Figure 15:
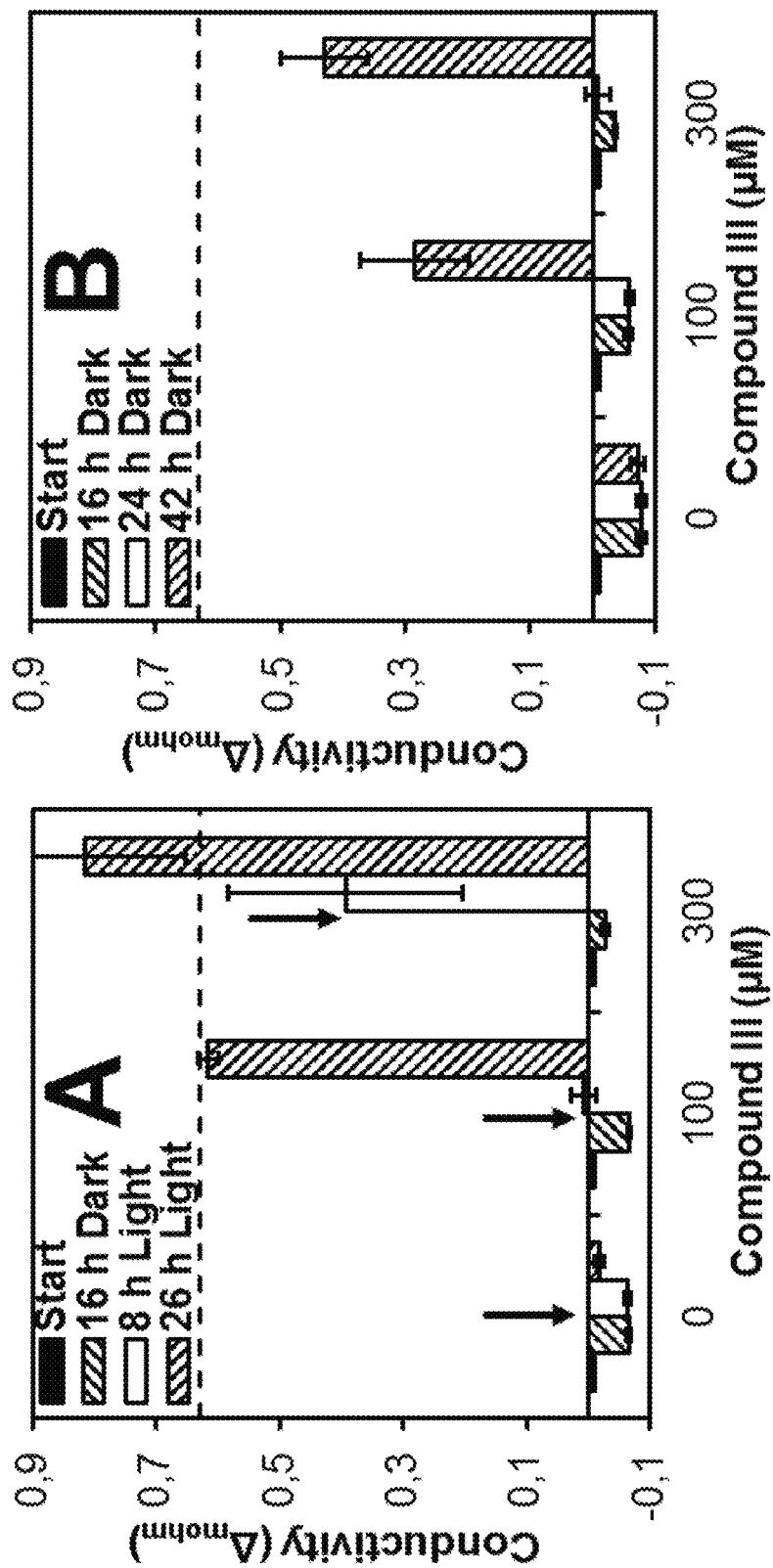
FIG. 15 shows the electrolyte leakage induced by compound of formula III (A and B) and compound of formula IV (C and D) under different conditions of illumination. A and C: 16 h dark+26 h light (arrows indicate the start of light exposure). Bars represent, from left to right in each grouping, start, 16 h dark, 8 h light, and 26 h light. B and D: 42 h dark. Bars represent, from left to right in each grouping, start, 16 h, 24 h, and 42 h. Data represent means of three replications±SD. The dotted line represents maximum leakage obtained by boiling the cotyledon disks.
Figure 15:
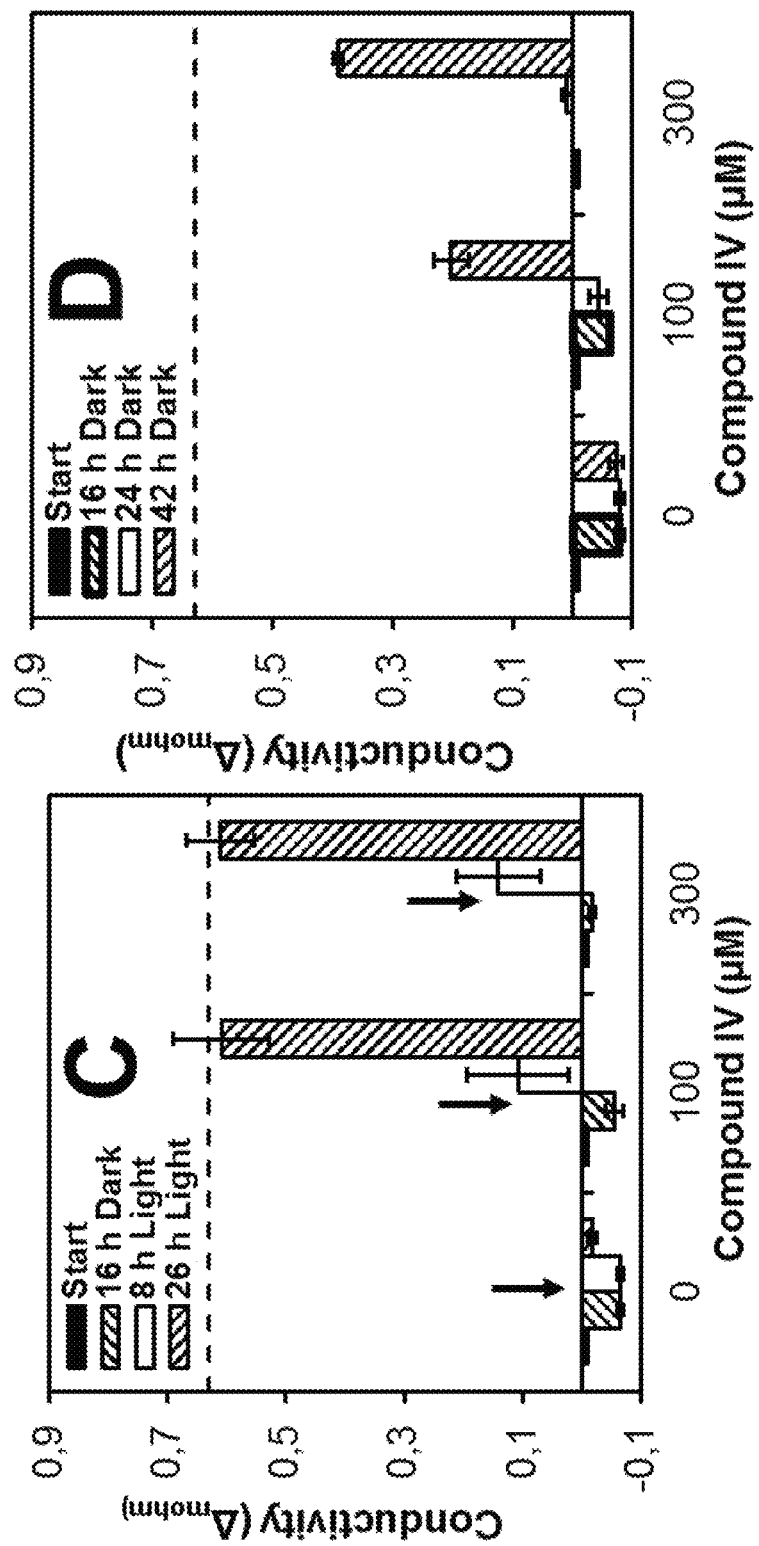

As may be seen in FIG. 15, the compounds of formulas III and IV produced a destabilization of cell membranes at 100 and 300 μM, leading to significant electrolyte leakage.

At 42 h of incubation, either in the dark or after 26 h of high light intensity exposure, both furanochromones triggered significant electrolyte leakage on cucumber cotyledon disks (as shown in FIG. 15).

Now referring to FIGS. 15-B and D, ion leakage caused by 100 and 300 μM the compounds of formulas III and IV (khellin and visnagin, respectively) in the dark is shown.

However, the most intense electrolyte leakage was observed after incubation of cucumber cotyledon disks with the compounds of formulas III and IV plus 26 h of high light intensity (FIGS. 15-A and C). Under these conditions, the effect of these compounds at 100 and 300 μM was comparable to the positive control obtained by boiling the cotyledon disks and bleaching was also observed (figure not shown).

Example 12

Effect of Compounds on Photosynthetic Efficiency

Figure 16:
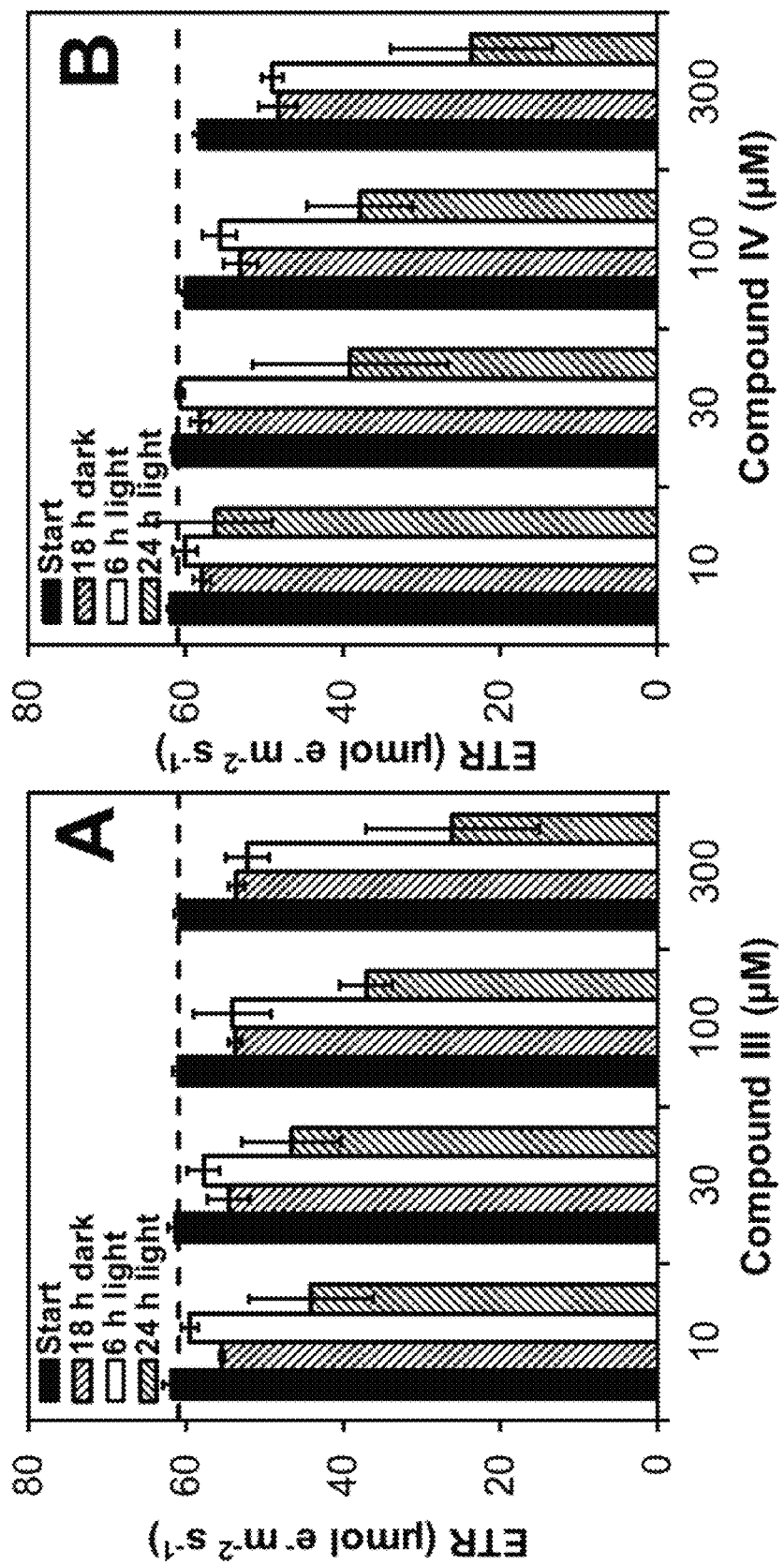
FIG. 16 shows the photosynthetic electron transport rate (ETR) in cucumber cotyledon disks exposed to different concentrations of compound of formula III (A) and compound of formula IV (B). Bars represent, from left to right in each grouping, start, 18 h dark, 6 h and 24 h light. Data are means of three replications±SD. The dotted line represents ETR of untreated solvent control.

The effects of pure compounds of formulas III and IV were evaluated by chlorophyll fluorescence measurements according to Dayan and Zaccaro.[24] Cucumber cotyledon disks were exposed to different dilutions of each furanochromone (10, 30, 100 and 300 μM). Control tissues were exposed to the same solvent as treated tissues but without the test compounds. The cotyledon disks were incubated in darkness for 18 h before exposure to light for 24 h. Photosynthetic quantum yield and electron transport rate (ETR) were measured. ETR values were expressed as percent of the ETR average values observed in control treatments. A time-course experiment was performed by measuring induced fluorescence of cotyledon disks after treatment at 3 h in darkness (start), after 18 h in darkness, after which the samples were placed in the light, and further measurements were made after 6 and 24 h of light exposure. The results of this experiment are shown in FIG. 16 (A: khellin [compound of formula III] and B: visnagin [compound of formula IV]). Three replicates were performed for each experiment. Bars represent, from left to right in each grouping, start, 18 h dark, 6 h light, and 24 h light.

Example 13

Detection and Measurement of Reactive Oxygen Species (ROS)

ROS cellular localization was determined by confocal microscopy using the fluorescent probe 2',7'-dichlorofluorescein diacetate (DCFDA). Cucumber cotyledon disks (1 cm) were treated as described for the electrolyte leakage assay. Five disks were placed in 5 cm-Petri plates and exposed to different dilutions of compounds of formulas III and IV (0, 100 and 300 μM). Disks were incubated in darkness for 16 h before exposure to high light intensity for 5 h, or in darkness for 30 h. As positive control, disks were exposed to the same solvent as treated tissues but with 10 mM hydrogen peroxide ($H_2O_2$) for 30 min in the light. After each treatment, they were vacuum-infiltrated in the dark with 50 μM DCFDA in 10 mM Tris-HCl pH 7.5, and ROS were visualized in an Eclipse TE-2000-E2 Nikon confocal microscope with excitation at 488 nm and emission at 515/530 nm. Green fluorescence intensities were quantified using the image processing package Fiji of ImageJ software.

In control disks and disks treated with the compounds at 100 μM, most of the label was recovered in chloroplasts as expected in light conditions, co-localizing with chlorophyll auto-fluorescence (Figure not shown). Image analysis indicates that ROS levels in cotyledon disks exposed to 300 μM of compound III (khellin) or compound IV (visnagin) were significantly higher than in the control (FIG. 17) and comparable to the treatment with $H_2O_2$. Under these conditions, additional green fluorescence was detected in other cellular compartments and membranes, indicating increased peroxidation.

Figure 18:
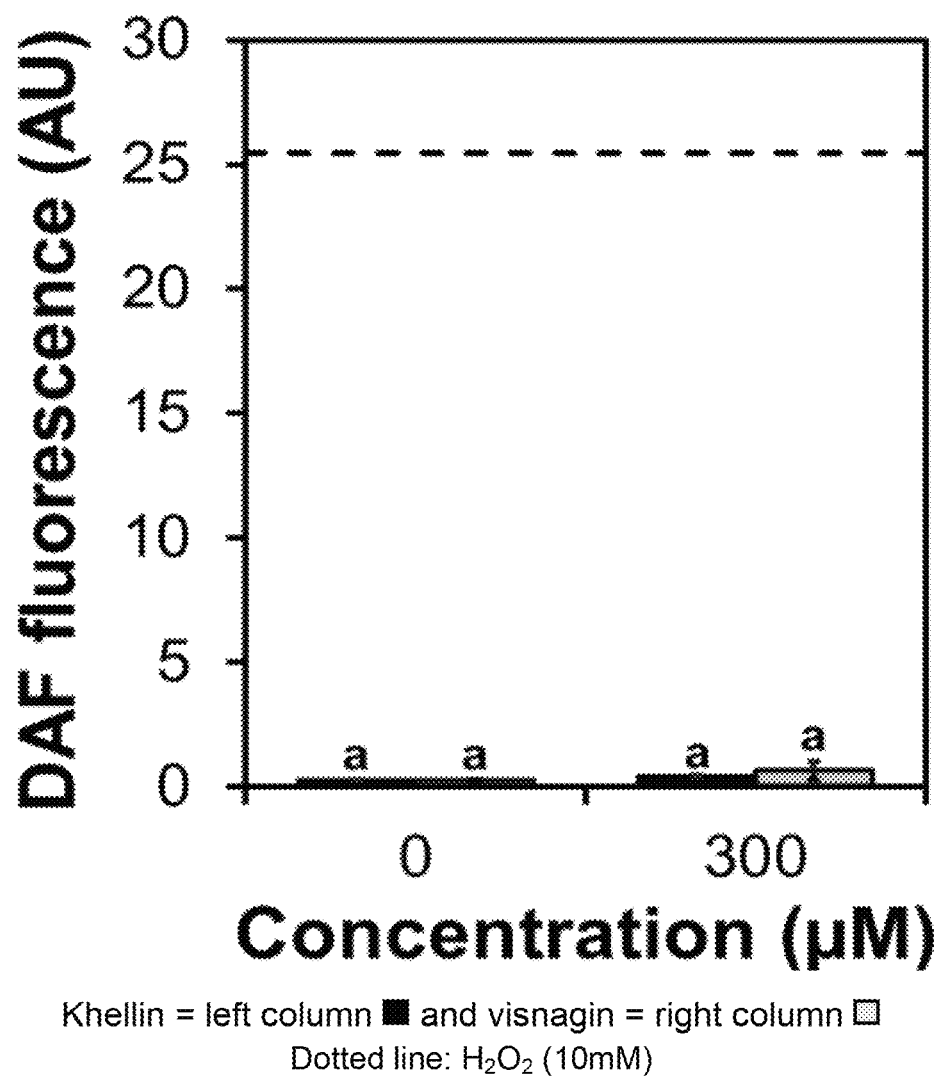
FIG. 18 shows the quantification of ROS in cucumber cotyledon disks in darkness. The dotted line represents the DAF fluorescence obtained by treatment of cotyledon disks with 10 mM $H_2O_2$. Left column=compound of formula III and Right column=compound of formula IV. Values are means of three replicates±SD and different letters above the bars indicate significant differences between treatments (p<0.05). AU=arbitrary units.

Additionally, detection and quantification of ROS was carried out in cucumber cotyledon disks in darkness. Under these conditions, it was not detected an increased peroxidation. DAF fluorescence measurements by treatment with khellin and visnagin are shown in FIG. 18, wherein the dotted line represents treatment with 10 mM $H_2O_2$.

Example 14

Effect on Cell Division

Onion seeds (*Allium Cepa* L. Evergreen Longwhite Bunching, Burpee & Co, 2012, EE.UU) germination was carried out for 7 days with a 14-h photoperiod in 9-cm-diameter Petri dishes on a filter paper disk that was moistened with a dilution (2.5 mL) of test compound or control. Stock solutions of test compounds (100×) were prepared in acetone, and aliquots were diluted in distilled water to get the final concentration. The control consisted of water with the same proportion of acetone (1% v/v) applied in the treatments.

Figure 19:
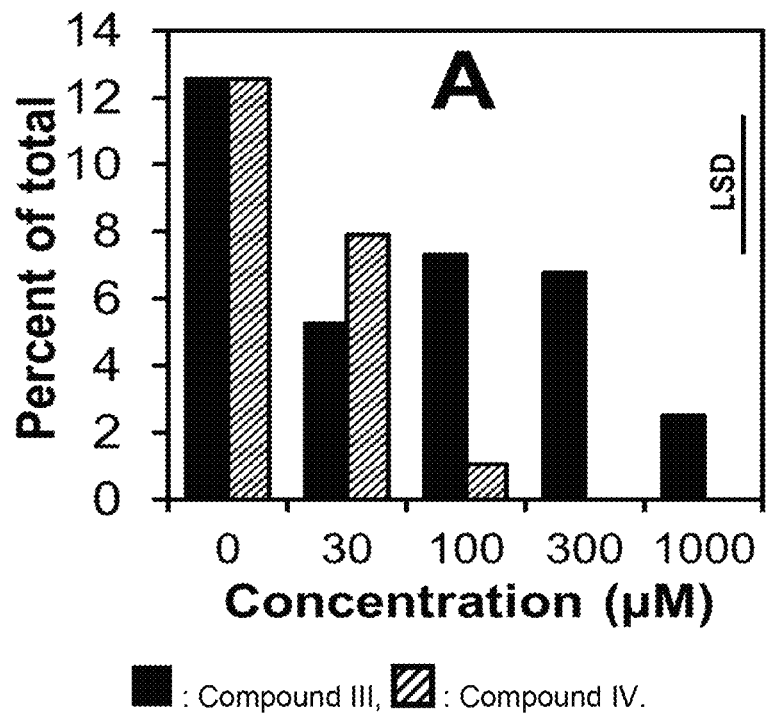
FIG. 19 shows the effects of compounds of formulas III and IV on *A. cepa* root meristem cell division. A) Amount of dividing cells after exposure to different concentrations of each furanochromone. Left column (in black)=compound of formula III and Right column (diagonal stripes)=compound of formula IV. B) Amount of dividing cells with and without washing *A. cepa* seeds at 3 days with distilled water after an exposure to compounds of formulas III and IV. Left column (in black)=without wash and Right column (diagonal stripes)=with wash. The amount of dividing cells is expressed as percent of total counted cells at 7 days. Data are means of three replicates.
Figure 19:
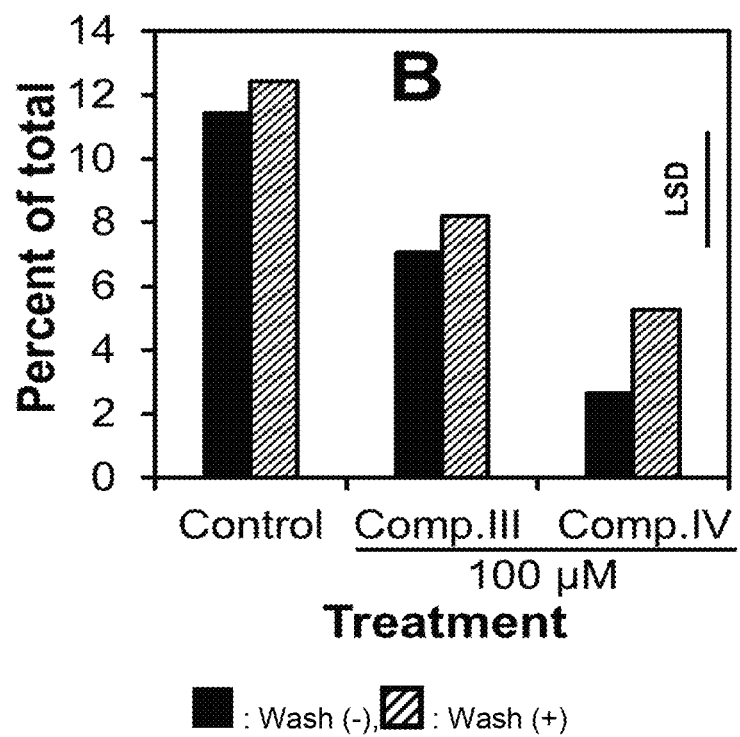

At 7 days of incubation, samples were processed for mitotic index analysis according to Armbruster et al.[25] Twenty root tips (1-cm sections) were fixed in glacial acetic acid:absolute ethanol (1:3 v/v) for 30 min. The segments were incubated with 5 N HCl at 25° C. for 1 h, and washed several times with distilled water. After that, segments were stained with Schiff's reagent for 45 min in the dark at 25° C. Stained meristematic regions were identified as purple tips. The root segments were transferred with tweezers to a drop of 45% acetic acid in water on a microscope slide. The tips were cut with a razor blade, and a cover slip was carefully placed over the tips and gently squashed by applying slight and constant pressure directly over the tissues. The edge of the cover slip was sealed with nail polish to delay the evaporation of acetic acid. The mitotic index was calculated by tallying the cells in various stages of mitosis. At least 1,000 cells/slide and in triplicate (3,000 cells per treatment) were counted for suitable statistical analysis of data. An Olympus BX60 microscope (Olympus, Center Valley) was used, and cells with abnormal mitotic configurations were counted as a separate class. The results of this experiment are shown in FIG. 19-A.

This procedure was slightly modified to evaluate if cell division inhibition caused by furanochromones was reversible. For this experiment onion seeds were incubated with solutions containing compounds of formulas III and IV for 3 days. After this period, all seeds were washed three times with distilled water and placed in new Petri dishes on moistened filter paper disks with distilled water (Wash+ treatment). Seeds were then incubated for 4 more days, after which a mitotic index analysis was performed. As a reference to compare results, another set of onion seeds was kept with test compounds or control for 7 days (Wash-treatment) before analysis. FIG. 19-B shows the results of this assay.

Example 15

Cell Death Determination

To evaluate cell death in roots, onion seeds were germinated and treated as described in postemergence assay with weed species. Onion seedlings were exposed to different doses of compounds of formulas III and IV (0, 100 and 300 µM) during 4 days. For the experiment with leaf disks 3-weeks-cucumber plants were used. One disk (1 cm) was placed in each well of a 12-well plate together with 1 mL of a 2% w/v sucrose/1 mM MES, pH 6.5 solution containing each of the compounds tested at the appropriate concentration (0, 100 or 300 µM) and acetone (1% v/v). Each assay was performed with leaf disks from different plants. Plates were sealed with Parafilm and incubated in a growth chamber at 21-27° C. with a 16/8 h light/dark cycle for 7 days.

Cell death was determined by Evans blue staining.[26] Root tips (5-mm sections) and leaf disks were incubated for 30 min in 0.25% w/v Evans blue aqueous solution at 25° C. on a rotary shaker. After staining, unbound dye was removed by extensive washing with deionized water. Three root tips (3 replicates) or one leaf disk (4 replicates) were ground in a tissue grind tube with 500 µL 1% w/v sodium dodecyl sulfate (SDS). The resulting suspension was centrifuged for 20 min at 20,000 g and the supernatant was used for dye quantification by monitoring the absorbance at 600 and 680 nm. Relative cell death was expressed as A600 for root tips and A600/A680 ratios for leaf disks.

Figure 22:
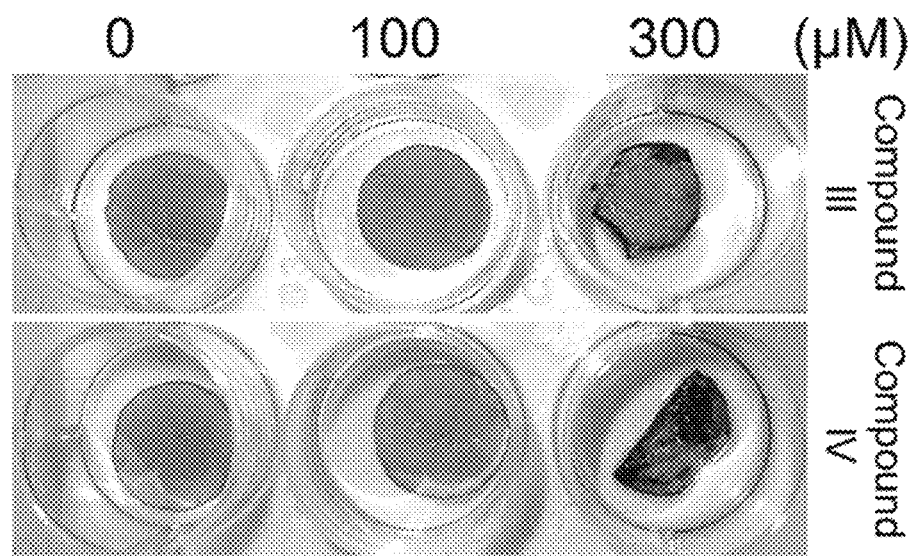
FIG. 22 shows cell death induced by compounds of formulas III and IV in cucumber leaf disks and onion roots. A) Cucumber leaf disks stained with Evans blue after exposure to different doses of compounds of formulas III and IV at 7 days; B) relative cell death in cucumber leaf disks estimated by the Evans blue staining; C) onion root tips stained with Evans blue after exposure to different doses of compounds of formulas III and IV at 4 days; D) relative cell death in onion root tips estimated by the Evans blue staining. Bars represent, from left to right in each grouping, compound of formula III (in black) and IV (diagonal stripes). Data are means of three replicates±SD. Different letters above the bars indicate significant differences between treatments (p<0.05).
Figure 22:
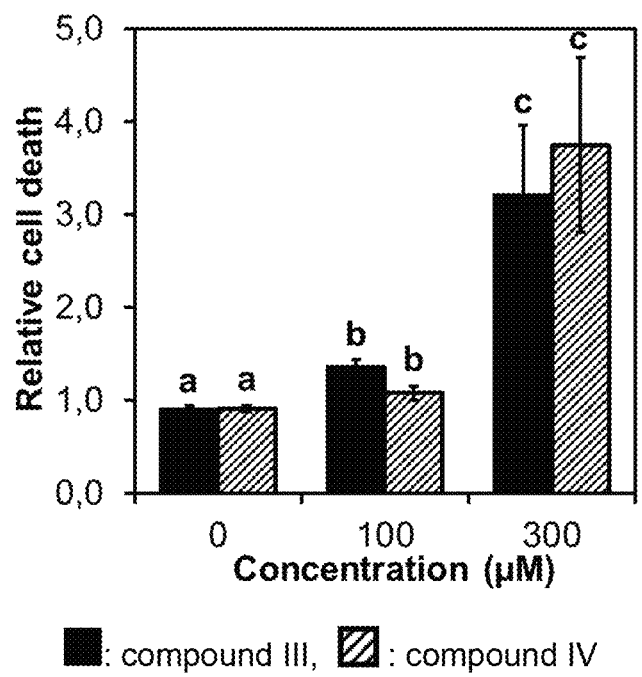
Figure 22:
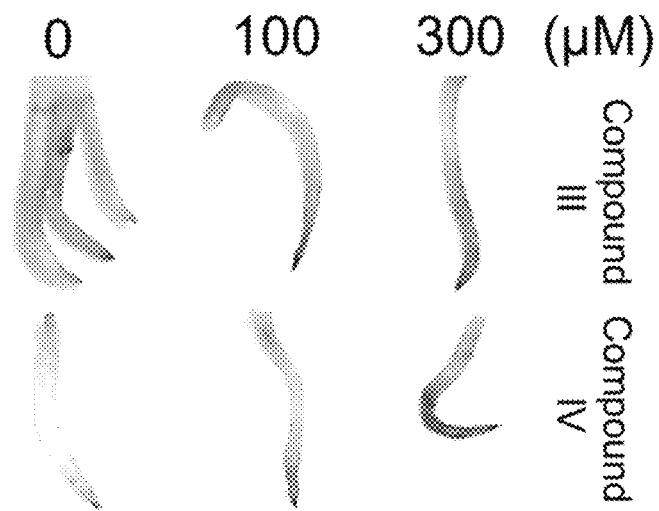
Figure 22:
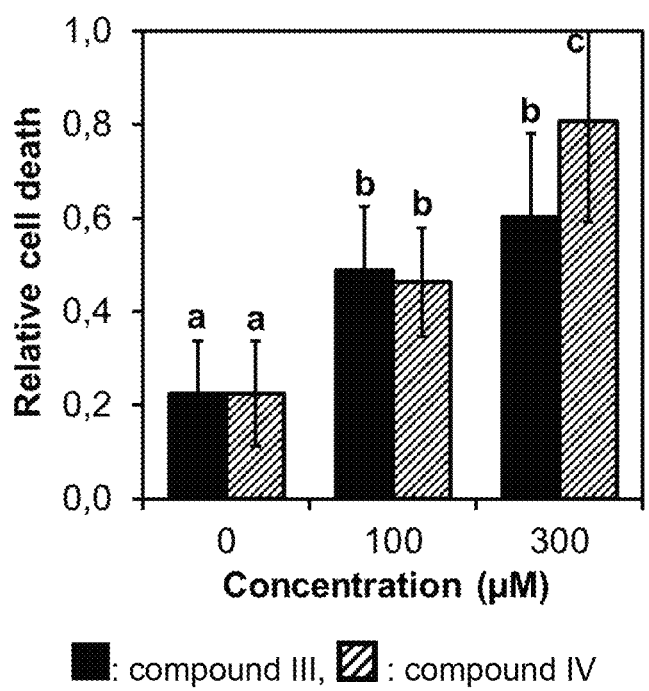

According to the results obtained by the Evans blue staining procedure, an increase (~35%) in relative cell death was detected with respect to the control when cucumber leaf disks were exposed to 100 µM khellin or visnagin (FIGS. 22A and 22B). This rose to a 3.5-fold increase when the concentration was 300 µM, indicating severe damage to leaf tissue at the higher dose.

Example 16

Analysis of Results of the Studies on the Possible Mode of Action of Compounds of Formulas III and IV The herbicidal activity or phytotoxicity of these two furanochromones has not been described before. Therefore, the present inventors conducted the assays described above with the aim of analyzing their mode(s) of action. Considering that the $IC_{50}$ values of these compounds to inhibit growth of duckweed, lettuce and ryegrass were in the range 110±11 to 244±37 µM, doses in the range of the IC50s were used for these assays.

The integrity of the plant plasma membrane is a good biomarker to help identify modes of action of herbicides and their dependence on light.[23] Stress conditions are often accompanied by the accumulation of high levels of ROS exceeding the detoxification mechanisms of plant cells. This can lead to membrane lipid peroxidation resulting in the uncontrolled release of cellular electrolytes.[27] Compounds of formulas III and IV produced a destabilization of the cell membranes at 100 and 300 µM, leading to significant electrolyte leakage (FIG. 15). The stress caused by these furanochromones may trigger this phenomenon through direct or indirect effects.

It has been recently suggested that electrolyte leakage, which stimulates proteases and endonucleases, and programmed cell death are often linked to each other when plant cells are severely stressed.[28] In cucumber leaf disks exposed to 100 µM compound of formula III or IV an increase (~35%) in relative cell death was detected with respect to the control, as estimated by the Evans blue staining procedure[26] (FIGS. 22A and 22B). This rose to a 3.5-fold increase when the concentration was 300 µM, indicating severe damage to leaf tissue at the higher dose. Such processes of plasma membrane destabilization and cell death induced by these furanochromones would explain the necrosis observed in plants sprayed with these compounds in greenhouse assays.

At 42 h of incubation, either in the dark or after 26 h of high light intensity exposure, both furanochromones triggered significant electrolyte leakage on cucumber cotyledon disks (FIG. 15). Ion leakage caused by 100 and 300 µM khellin and visnagin (compounds of formulas III and IV, respectively) in the dark (FIGS. 15B and D) indicates that the mode of action of these compounds is not light-dependent and involves cellular leakage. This was also shown when phytotoxicity of khellin and visnagin was compared wider light and dark conditions. There were no significant differences in their phytotoxic effects on lettuce in light and darkness (FIG. 14).

However, the most intense electrolyte leakage was observed after incubation of cucumber cotyledon disks with compound of formula III or IV plus 26 h of high light intensity (FIGS. 15A and C). Under these conditions, the effect of these compounds at 100 and 300 µM was comparable to the positive control obtained by boiling the cotyledon disks and bleaching was also observed. This may be a consequence of the higher level of ROS produced in light, combined with the stress caused by the furanochromones.

Most biocides cause ROS generation as a side effect before cell death occurs. To evaluate if there was an increase in ROS levels after treatment with khellin or visnagin, cucumber cotyledon disks were studied under pre-symptomatic conditions (before the detection of high levels of electrolyte leakage). As for cell death and electrolyte leakage assays, each compound was tested at 100 and 300 µM. The tissues were incubated in darkness (16 h) before exposure to high light intensity for 5 h. Cucumber cotyledon disks were subsequently treated with the ROS-dependent fluorescent probe DCFDA for visualization by confocal microscopy.

In control disks and disks treated with the compounds at 100 µM, most of the label was recovered in chloroplasts as expected in light conditions, co-localizing with chlorophyll auto-fluorescence (figure not shown). Image analysis indicates that ROS levels in cotyledon disks exposed to 300 µM khellin or visnagin were significantly higher than in the control (FIG. 17) and comparable to the treatment with $H_2O_2$. Under these conditions, additional green fluorescence was detected in other cellular compartments and membranes, indicating increased peroxidation.

According to these results, the treatment with these furanochromones at 300 µM, together with high light intensity, caused an increase in cellular ROS levels prior to the plasma membrane destabilization. However, no significantly higher generation of ROS was detected after treatment with compounds at 100 µM plus 5 h of high light intensity (FIG. 17), even though visnagin (compound of formula IV) caused electrolyte leakage at this dose after 8 h in the light. A longer exposure to light is probably required to detect ROS generation. Thus, the increase in ROS may not be directly associated with the molecular target site of these compounds, but is more likely to be a secondary or tertiary effect of what is causing cellular leakage. Moreover, after incubation in complete darkness for 30 h, ROS generation was not detected in cucumber cotyledon disks with either khellin or visnagin at 300 µM (FIG. 18). This observation suggests that the main source of ROS in furanochromones-treated plants is associated with photosynthetic activities. Moreover, while ROS propagation may contribute to damage in the light, the basic mechanism of visnagin and khellin (compounds of formulas III and IV, respectively) toxicity would be ROS-independent.

Figure 17:
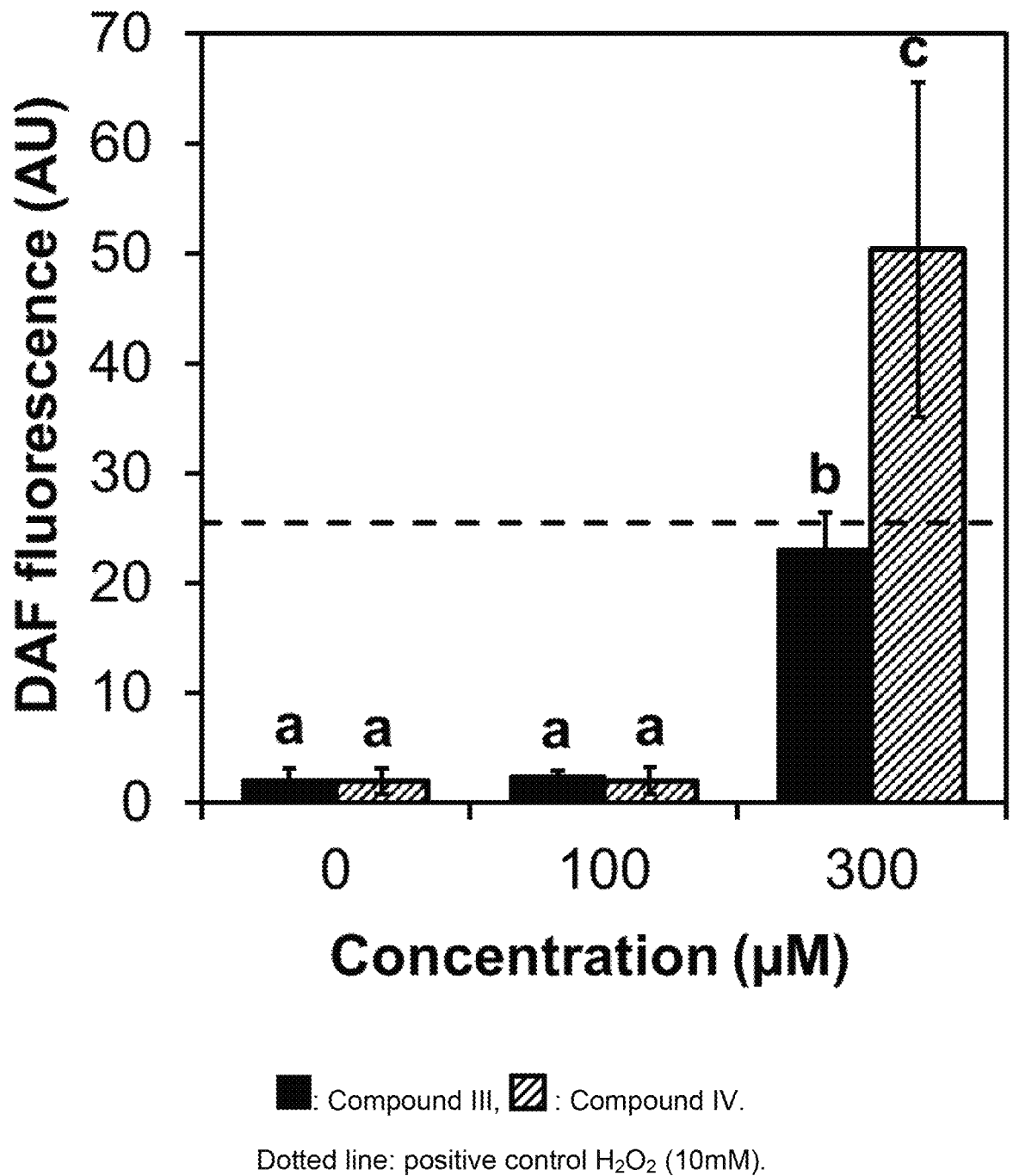
FIG. 17 shows reactive oxygen species (ROS) production in cucumber cotyledon disks exposed to compounds of formulas III and IV. Cucumber cotyledon disks were treated with the ROS-dependent fluorescent probe DCFDA and DAF fluorescence was quantified. Left column (in black) ■=compound of formula III and Right column (striped, white bottom) ▨=compound of formula IV. The dotted line represents the DAF fluorescence obtained by treatment of cotyledon disks with $H_2O_2$. Values are means of three replicates±SD and different letters above the bars indicate significant differences between treatments (p<0.05). AU=arbitrary units.

Chlorophyll fluorescence measurements showed that khellin and visnagin significantly reduce the photosynthetic efficiency of cucumber cotyledon disks. The ETR was reduced ~35 and ~50% after 24 h of incubation in the light (42 h total) with these compounds at 100 and 300 µM, respectively (FIG. 16). These results suggest that photosynthesis is not a primary target of khellin or visnagin. Considering the long time period of incubation and irradiation required for a significant photosynthetic efficiency decline, compounds of formulas III and IV probably affect photosynthesis indirectly, most likely altering chlorophyll fluorescence as a consequence of the membrane peroxidation and destabilization previously detected under these conditions (FIGS. 15 and 17).

Figure 20A:
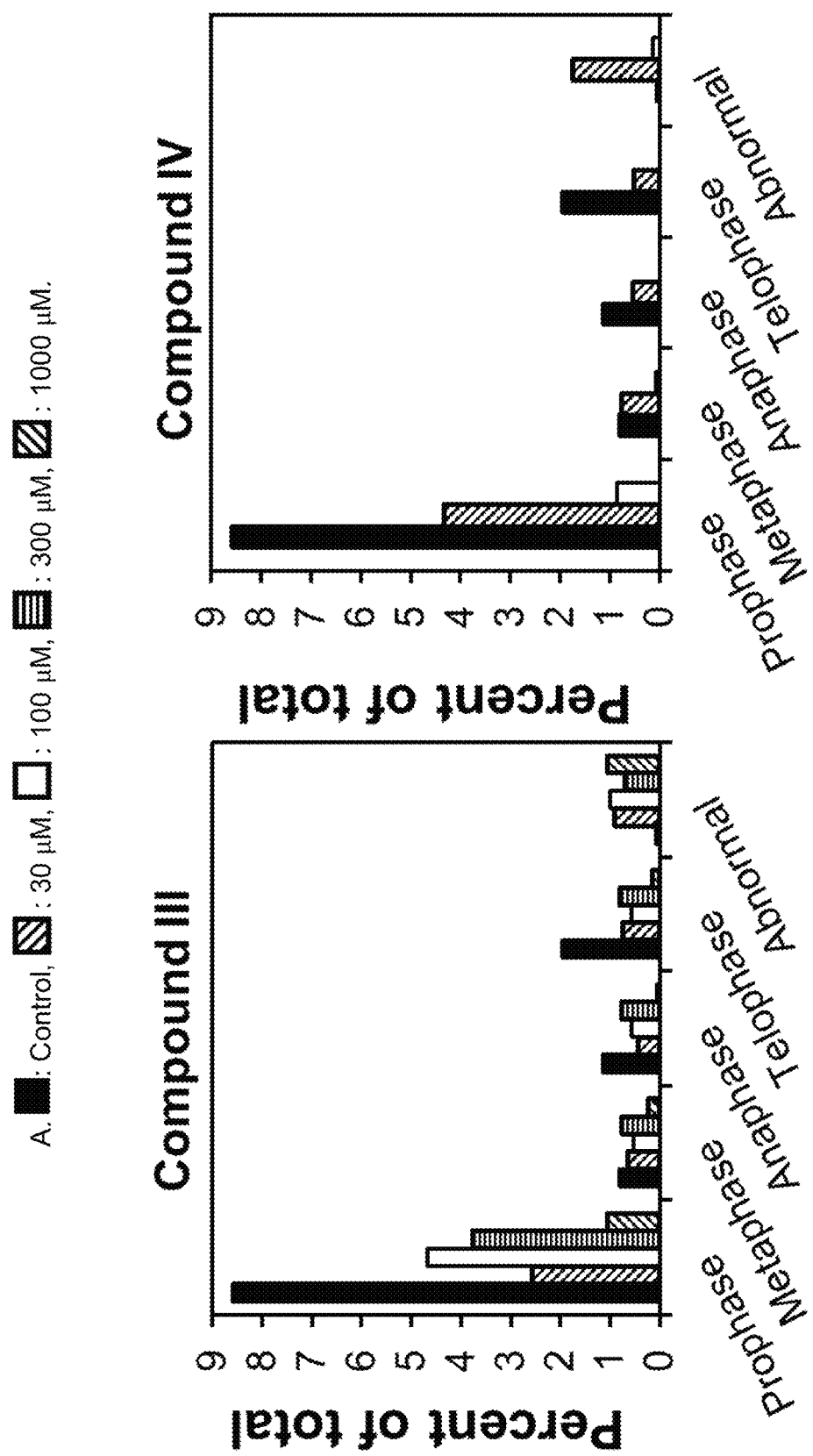
FIG. 20 shows the dose-response effects of compounds of formulas III and IV on *A. cepa* root meristem cell division. A) Amount of dividing cells in each phase of mitosis and with abnormal configurations. Bars represent, from left to right in each grouping, 0 µM (control), 30 µM, 100 µM, 300 µM, and 1000 µM. B) Photographs of meristem cells of *A. cepa* at 7 days: (1-2) control, (3-7) 30 µM compounds of formulas IV, (8) 100 µM compounds of formulas IV, (9-11) 300 µM compound of formula III, (12) 1000 µM compound of formula III. P: prophase, M: metaphase, A: anaphase, T: telophase, CA: chromosomal aberrations and MN: micronuclei. The amount of dividing cells is expressed as percent of total counted cells at 7 days.
Figure 20B:
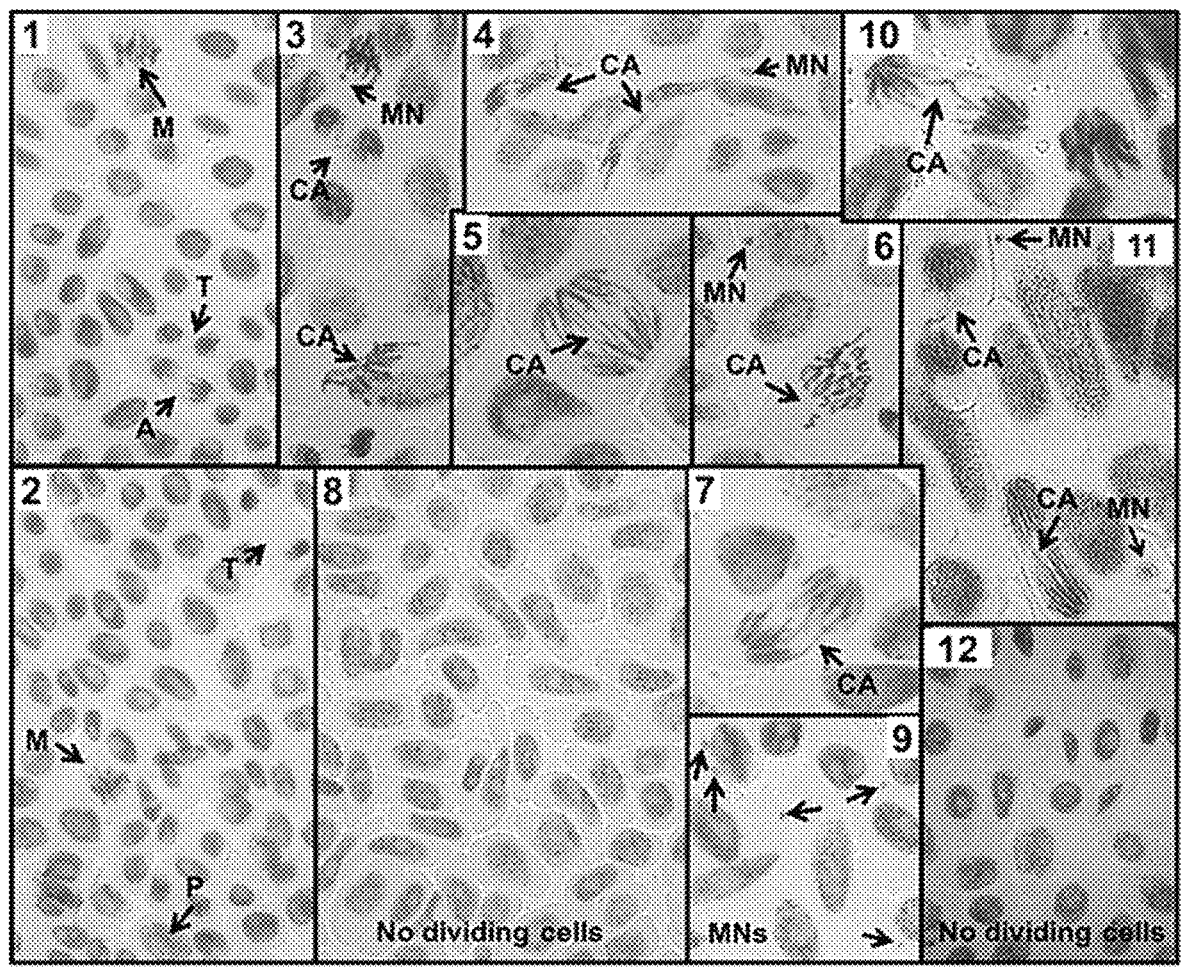

The effect of khellin and visnagin on cell division was evaluated by mitotic index analysis of root meristem cells of onion (*A. cepa*).[29-30] Since the sensitivity of this plant species to these furanochromones was unknown, a broader range of concentrations was tested (0 to 1000 µM). Both compounds inhibited cell division in a dose-dependent manner (FIG. 19A). Visnagin (compound of formula IV) was more active than khellin (compound of formula III), and completely inhibited onion cell division at 300 µM. Inhibition was not associated with the arrest of a particular phase of mitosis. The percentage of cells observed in each mitotic phase after exposure to these furanochromones was smaller than in the control. However, when there was not a total inhibition, the relative proportion of cells in the mitotic phases after treatment with both compounds was comparable to the control (FIG. 20A). A different situation was observed regarding cells with abnormal configurations such as chromosome aberrations (chromosome bridges, breaks, and losses), nuclear abnormalities (lobulated nuclei, nuclei carrying nuclear buds, polynuclear cells, etc.) or micronuclei. The proportion of these types of cells with abnormal configurations after treatment with khellin or visnagin was higher than in the control (FIG. 20).

Figure 21:
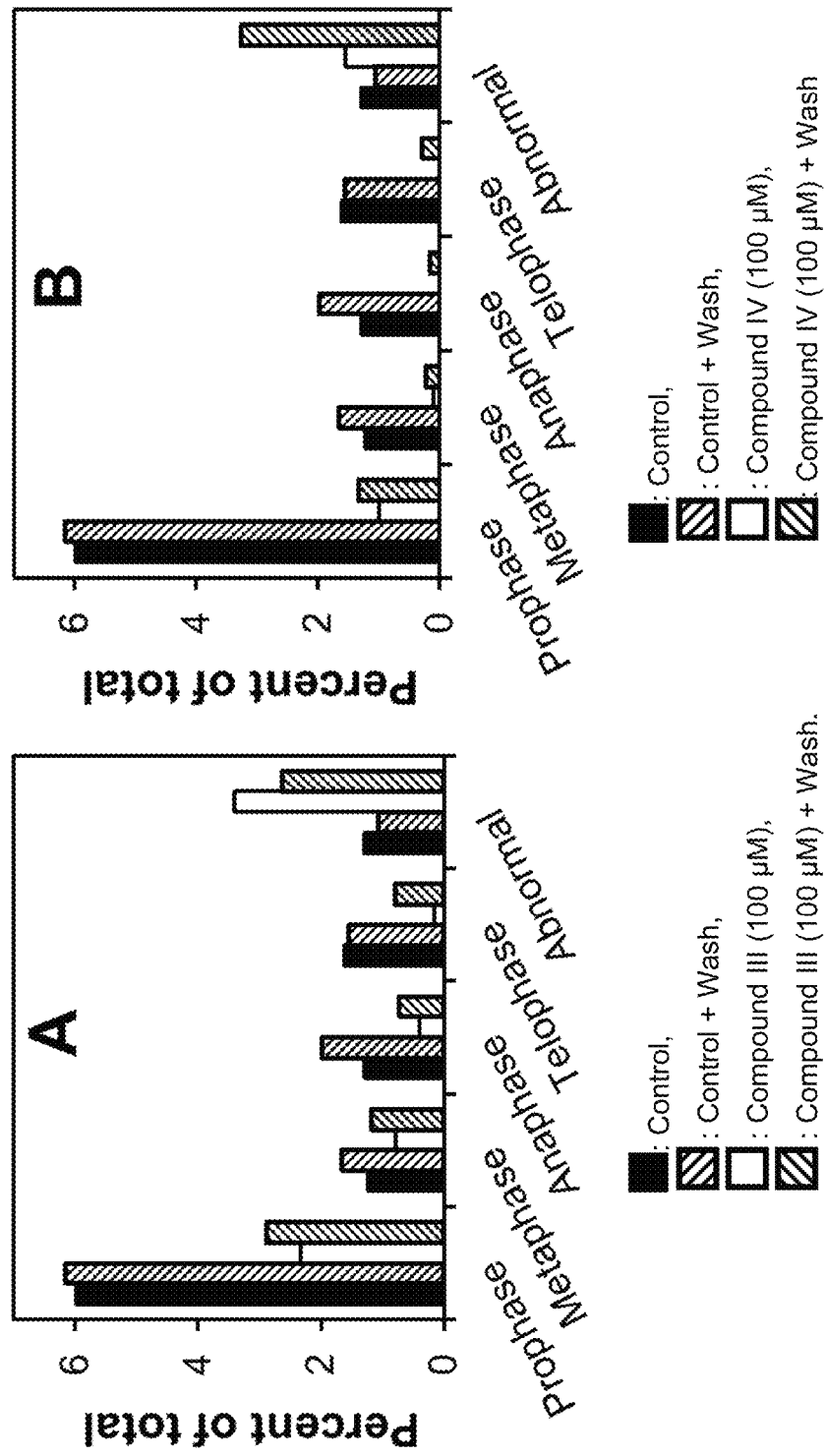
FIG. 21 shows the evaluation of reversibility of cell division inhibition caused by compounds of formulas III and IV. A-B) Amount of dividing cells in each phase of mitosis and with abnormal configurations, without and with washing *A. cepa* seeds at 3 days with distilled water. Bars represent, from left to right in each grouping, control, control (wash +), 100 µM Compound III (A) or Compound IV (B), and 100 µM Compound III (A) or Compound IV (B) (wash +). C) Photographs of meristem cells of onion at 7 days, after exposure to different treatments: (1-2) control, (3-4) control (wash +), (5-7) 100 µM Compound III, (8-10) 100 µM Compound III (wash +), (11) 100 µM Compound IV, (12-16) 100 µM Compound IV (wash +). P: prophase, M: metaphase, A: anaphase, T: telophase, CA: chromosomal aberrations, MN: micronuclei and NA: nuclear abnormality. Amount of dividing cells is expressed as percent of total counted cells at 7 days.
Figure 21:
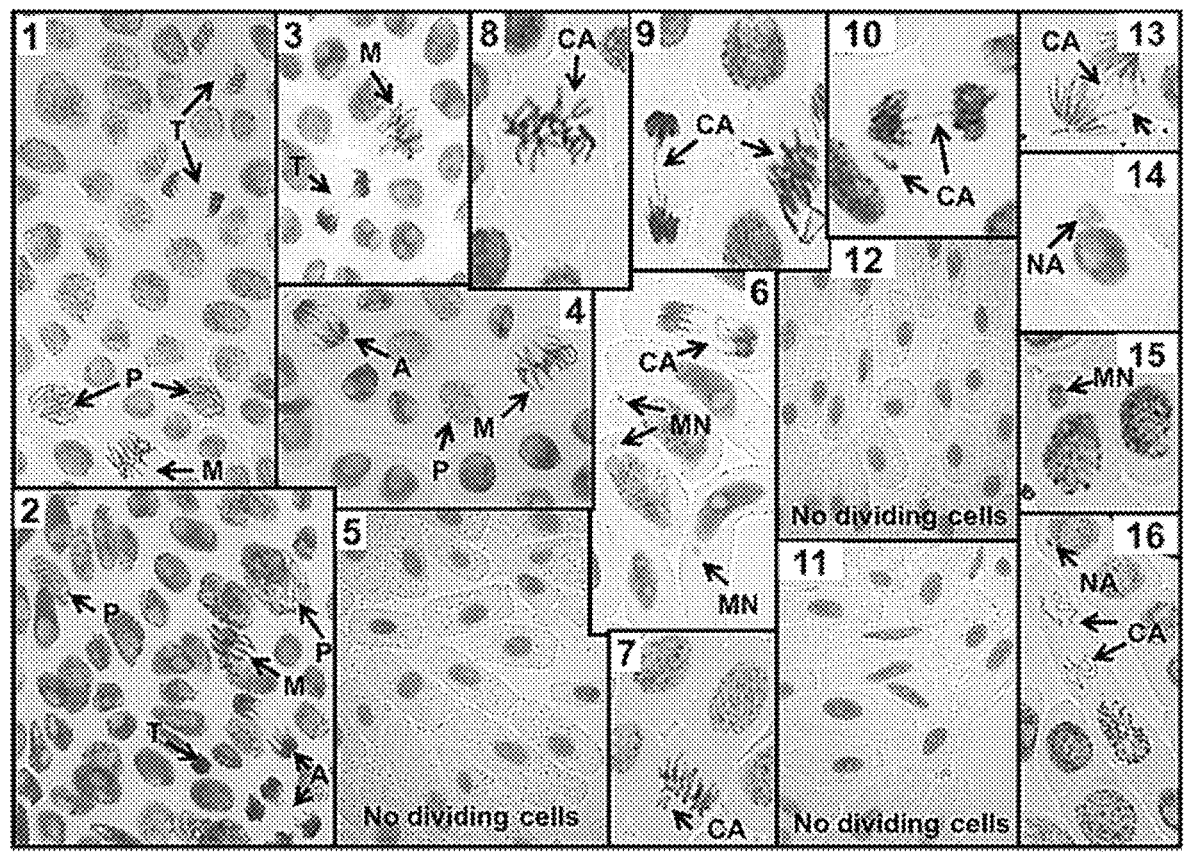

Inhibition of cellular division caused by khellin and visnagin at 100 µM was irreversible under the experimental conditions employed (FIG. 19B). As in the dose-response assay, alterations in the distribution of dividing cells into the different mitotic phases with respect to the control failed to be detected, except for cells with abnormal configurations whose proportion after treatment with furanochromones was higher than in the control (FIG. 21). However, root meristem cells of onion did not recover their normal division rate after washing the seeds at 3 days with distilled water. This effect might be associated with a cell death process induced by these compounds. In onion roots exposed to 100 µM khellin or visnagin, a two-fold increase in relative cell death was detected (FIGS. 22C and 22D). These furanochromones inhibited cell division, but also caused cell death in onion roots which was dependent on the dose used. At 300 µM, both compounds induced a two-fold increase in relative cell death compared to 100 µM, and a 3- to 4-fold increase relative to the control conditions (FIGS. 22C and 22D).

The present results indicate that the mode of action of khellin and visnagin (compounds of formulas III and IV, respectively) could be a complex process involving multiple targets. The inhibition of cell division and the increased cell death caused by these furanochromones, together with cell membrane destabilization, would explain the reduction in plant growth. In addition, these effects explain the development of necrosis and abnormal leaves observed after treatment with both compounds.

Since membrane destabilization caused by these furanochromones was intensified after a light irradiation period, and considering their chemical nature, a phototoxic effect might be expected. Some biological activities caused by furanochromones, as well as their possible role in plant defense, have been associated to their photoactivity.[16,17,19,20,31-33] However, their phytotoxicity was not light-dependent, because both compounds induced electrolyte leakage in darkness, and the inhibition of lettuce growth under light and darkness was similar.

Despite the similarities in chemical structures and properties that furanochromones share with furanocoumarins, or psoralens, they differ in their photochemical properties, and in their ability to photodamage eukaryotic cells and form cross-links.[34] Visnagin is much less phototoxic and photomutagenic than bergapten when compared equimolar concentrations and equal UV-A doses on the green alga *Chlamydomonas reinhardtii*.[17] According to Martelli et al.[35] visnagin, and khellin, could react with DNA and generate activated oxygen species upon UV irradiation. However, in later work, the extent of photoaddition was low compared with most furanocoumarins, and oxygen-dependent photo-oxidation of DNA was not observed.[36] The absence of DNA photo-oxidation after treatment with visnagin or khellin plus UVA suggested that furanochromones do not have any photodynamic effect on DNA. The phototoxicity of these molecules, albeit low when compared to furanocoumarins, might contribute to their herbicidal activity. Under high irradiation conditions, ROS production increased after treatment with khellin and visnagin (FIG. 17), resulting in higher oxidative damage to cell membranes and other cellular components. However, the potential phototoxic effect under high light would not explain the phytotoxicity in the dark, indicating that other mechanisms are involved.

In conclusion, the mode of action of these furanochromones appears to be a complex process. It is not light-dependent and involves effects on membrane stability, cell division and cell viability in leaves and roots that may not be related. Both compounds also reduce photosynthetic efficiency through indirect effects and induce oxidative damage under high light intensity. Visnagin had the best contact postemergence herbicidal activity in greenhouse assays. Its effect was comparable to the commercial bioherbicide pelargonic acid at the same rate, indicating visnagin's potential as a bioherbicide or lead molecule for the discovery of new synthetic herbicides.

Statistical Analysis. Data from dose-response experiments were analyzed by a log-logistic model[37-38] using the dose-response curve module[39] of R software version 2.2.1.[40] Concentrations required for 50% germination or growth inhibition relative to control ($IC_{50}$ values) were obtained from estimated parameters in the regression curves. The standard error (SE) of each estimation is provided. Data from phytotoxicity bioassays in the laboratory and greenhouse, ROS and cell death quantifications were analyzed by ANOVA using the InfoStat statistical software version 2015,[41] and Scheffe's test was employed to compare the means at $\alpha=0.05$.

Conclusions

As described in detail above, the isolated compounds, khellin and visnagin, significantly inhibited the development of lettuce Lactuca sativa ($IC_{50\ germination}$=700 and 740 μM, $IC_{50\ growth}$=110 and 170 μM) and duckweed Lemna paucicostata ($IC_{50\ growth}$=160 and 120 μM). Also during laboratory bioassays in Petri dishes both compounds at 0.5 and 1.0 mM strongly interfered with growth and germination of different weeds which included five grasses [ryegrass (Lolium multiflorum), barnyardgrass (Echinocloa crus-galli), crabgrass (Digitaria sanguinalis), foxtail (Setaria italica), and millet (Panicum sp.)] and two broadleaf species [morningglory (Ipomea sp.) and velvetleaf (Abutilon theophrasti)]. The inhibitory effects of the natural compounds on certain species were similar to those caused by acetochlor (0.54 mM) and glyphosate (0.75 mM).

Commercial chemical standards (Sigma Aldrich) of khellin and visnagin were studied and their phytotoxic activities were verified. In addition, five analogs (Formulas II, V, VI, VII and VIII above) were evaluated and showed significant phytotoxicity.

Particularly visnagin (Formula IV above) showed the most promising activity. It exhibited a significant contact postemergence herbicidal activity on velvetleaf (A. theophrasti) and crabgrass (D. sanguinalis) during greenhouse tests at 2 kg ai ha$^{-1}$. Moreover, its effect at 4 kg ai ha$^{-1}$ against velvetleaf, crabgrass and barnyardgrass (E. crus-galli) was comparable to the bioherbicide pelargonic acid at the same rate. These results support visnagin as a bio herbicide or lead molecule for the development of new synthetic herbicides.

Additionally, said results suggest that the mode of action of these furanochromones is a process involving multiple targets: membrane destabilization, cell division inhibition and cell death.

Without wishing to be bound by theory, the herbicidal activity could be related to the potential phototoxicity associated with this type of compound. However, although the membrane destabilization was intensified after an irradiation period, the phytotoxic activity of these natural compounds was not light-dependent.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by exemplary embodiments and optional features, modification and variation of the inventions embodied therein herein disclosed may be resorted to by those skilled in the art, and that such modifications and variations are considered to be within the scope of this invention.

In addition, where features or aspects of an invention are described in terms of the Markush group, those schooled in the art will recognize that the invention, is also thereby described in terms of any individual member or subgroup of members of the Markush group. It is also to be understood that the above description is intended to be illustrative and not restrictive. Many embodiments will be apparent to those of in the art upon reviewing the above description. The scope of the invention should therefore, be determined not with reference to the above description, but should instead be determined with reference to the appended claims, along with the full scope of equivalents to which such claims are entitled. Those skilled in the art will recognize, or will be able to ascertain using no more than routine experimentation, many equivalents to the specific embodiments of the invention described. Such equivalents are intended to be encompassed by the following claims.

REFERENCES (1) Lamiri, A.; Lhaloui, S.; Benjilali, B.; Berrada, M. Insecticidal effects of essential oils against Hessian fly, Mayetiola desstructor (Say). Field Crops Res. 2001, 71 (1), 9-15.

(2) Abdel-Latif, A. M. Tooth-pick seed Ammi visnaga L. extracts as grain protectants against the granary weevil Sitophilus granarius L. Egypt J. Agric. Res. 2004, 82 (4), 1599-1608.

(3) Ahmed, S. M. S.; Al-Moajel, N. H. Effect of toothpick (Ammi bisnaga L.) seed extracts on the rice weevil Sitophilus oryzae (Coleoptera: Curculionidae). Arab Univ. J. Agric. Sci. 2005, 13 (2), 549-557.

(4) Amer, A.; Mehlhorn, H. Persistency of larvicidal effects of plant oil extracts under different storage conditions. Parasitol. Res. 2006, 99, 473-477.

(5) Pavela, R. Larvicidal effects of various Euro-Asiatic plants against *Culex quinquefasciatus* say larvae (Diptera: Culicidae). Parasitol. Res. 2008, 102, 555-559.

(6) Ghoneim, K.; Amer, M.; Al-Daly, A.; Mohammad, A.; Khadrawy, F.; Mahmoud, M. A. Disrupted survival, growth and development of desert locust *Schistocerca gregaria* (Forskal) (Orthoptera: Acrididae) by extracts from toothpick weed *Ammi visnaga* Lamarck (Apiaceae). Int. J. Biosci. 2014, 5 (1), 397-414.

(7) Ghoneim, K.; Amer, M.; Al-Daly, A.; Mohammad, A; Khadrawy, F.; Mahmoud, M. A. Disturbed acid and alkaline phosphatase activities in desert locust *Schistocerca gregaria* (Forskal) (Orthoptera; Acrdidae) by extracts from the khella plant *Ammi visnaga* L. (Apiaceae). Int. J. Adv. Res. 2014, 2 (5), 584-596.

(8) Ghoneim, K.; Mohammad, A.; Al-Daly, A.; Amer, M.; Khadrawy, F.; Mahmoud, M. A. Metabolic responsiveness of desert locust *Schistocerca gregaria* (Forskal) (Orthoptera: Acrididae) to the khella plant *Ammi visnaga* L. (Apiaceae) extracts. Int. J. Adv. Sci. 2014, 7 (2), 204-216.

(9) Pavela, R. Acaricidal properties of extracts and major furanochromenes from the seeds of *Ammi visnaga* Linn. against *Tetranychus urticae* Koch. Ind. Crops Prod. 2015, 67, 108-113.

(10) Khan, R.; Waqas, M.; Khan, A. M. Allelopathy of *Ammi visnaga* Lam. toward legumes. Herbologia. 2012, 13 (1), 11-19.

(11) Mubarik, S.; Khan, I.; Memon, R. A.; Shaheen, G.; Hashmattullah. Allelopathic effects of important weeds on germination and growth of maize (*Zea mays* L.). Pak. J. Weed Sci. Res. 2015, 21, 173-180.

(12) Hashim, S.; Jan, A.; Marwat, K. B.; Khan, M. A. Phytochemistry and medicinal properties of *Ammi visnaga* (Apiacae). Pak. J. Bot. 2014, 46 (3), 861-867.

(13) Vanachayangkul, P.; Byer, K.; Khan, S.; Butterweek, V. An aqueous extract of *Ammi visnaga* fruits and its constituents and visnagin prevent cell damage caused by oxalate in renal epithelial cells. Phytomedicine, 2010, 17 (8-9), 653-658.

(14) Vanachayangkul, P.; Chow, N.; Khan, S. R.; Butterweck, V. Prevention of renal crystal deposition by an extract of *Ammi visnaga* L. and its constituents khellin and visnagin in hyperoxaluric rats. Urol. Res. 2011, 39 (3), 189-195.

(15) Maleck, M.; Carvalho dos Santos, F. C.; Teixeira Serdeiro, M.; Guímarães, A. É.; Ferreira, B.; Gunaydin, K.; de Almeida, A. P. Khellin: A furanochromone with toxicity against *Oncopeltus fasciatus* (Hemiptera) and *Aedes aegypti* (Diptera). J. Nat Pharm 2013, 4 (1), 32-36.

(16) Ortel, B.; Tanew, A.; Honigsmann, H. Treatment of vitiligo with khellin and ultraviolet A. J. Am. Acad. Dermatol. 1988, 18 (4), 693-701.

(17) Schimmer, O. Studies on the photobiological activity of two naturally occurring furochromones, visnagin and khellin, in *Chlamydomonas reinhardtii*. Mutagenesis. 1997, 12 (3), 141-145.

(18) Kwon, M.-S.; Lee, J.-K.; Park, S.-H.; Sim, Y.-B.; Jung, J.-S.; Won, M.-H.; Kim, S.-M.; Suh, H.-W. Neuroprotective effect of visnagin on kainie acid-induced neuronal cell death in the mice hippocampus. Korean J. Physiol. Pharmacol. 2010, 14 (5), 257-263.

(19) De Leeuw, J.; Assen, Y. J.; van der Beck, N.; Bjerring, P.; Martino Neumann, H. A. Treatment of vitiligo with khellin liposomes, ultraviolet light and blister roof transplantation J. Eur. Acad. Dermatol. Venereol. 2011, 25 (1), 74-81.

(20) Abu-Hashem, A. A.; El-Shazly, M. Synthesis, reactions and biological activities of furochromones: a review. Eur. J. Med. Chem. 2015, 90, 633-665.

(21) Elgamal, M. H. A.; Elewa, E. A.; Elkhrisy, E. A. M.; Duddeck, H. $^{13}$C NMR chemical shifts and carbon-proton coupling constants of some furocoumarins and furochromones. Phytochemistry 1979, 18, 139-143.

(22) Elgamal, M. H. A.; Shalaby, N. M. M.; Duddeck, H.; Rosenbaum, D. Synthesis of some furochromonesulfonamide derivatives with potential pharmacological activity. J Heterocycl Chem 1987, 24, 721-724.

(23) Dayan, F. E.; Watson, S. B. Plant cell membrane as a marker for light-dependent and light-independent herbicide mechanisms of action. Pestic. Biochem. Physiol. 2011, 101 (3), 182-190.

(24) Dayan, F. E.; Zaccaro, M. L. de M. Chlorophyll fluorescence as a marker for herbicide mechanisms of action. Pestic. Biochem. Physiol. 2012, 102, 189-197.

(25) Armbruster, B. L.; Molin, W. T.; Bugg, M. W. Effects of the herbicide dithiopyr on cell division in wheat root tips. Pestic. Biochem. Physiol. 1991, 39, 110-120.

(26) Baker, C. J.; Mock, N. M. An improved method for monitoring cell death in cell suspension and leaf disc assays using evans blue. Plant Cell, Tissue Organ Cult. 1994, 39 (1), 7-12.

(27) Mittler, R. Oxidative stress, antioxidants and stress tolerance. Trends Plant Sci 2002, 7 (9), 405-441.

(28) Demidchik, V.; Straltsova, D.; Medvedev, S. S.; Pozhvanov, G. a.; Sokolik, A.; Yurin, V. Stress-induced electrolyte leakage: The role of K+-permeable channels and involvement in programmed cell death and metabolic adjustment. J Exp Bot 2014, 65 (5), 1259-1270.

(29) Dayan, F. E.; Romagni, J. G.; Duke, S. O. Investigating the mode of action of natural phytotoxins. J Chem Ecol 2000, 26 (9), 2079-2094.

(30) Leme, D. M.; Marin-Morales, M. A., *Allium cepa* test in environmental monitoring: A review on its application. Mutat Res—Rev Mutat Res 2009, 682, 71-81.

(31) Downum, K. R. Light-activated plant defence. New Phytol 1992, 122, 401-420.

(32) Heitz, J. R. Pesticidal applications of photoactivated molecules. Amer Chem Soc Symp Ser 1995, 1-16.

(33) Hofer, A.; Kerl, H.; Wolf, P. Long-term results in the treatment of vitiligo with oral khellin plus UVA. Eur J Dermatol 2001, 11 (3), 225-229.

(34) Morliere, P.; Hönigsmann, H.; Averbeck, D.; Dardalhon, M.; Hüppe, G.; Ortel, B.; Santus, R.; Dubertret, L. Photerapeutic, photobiologic, and photosensitizing properties of khellin. J Invest Dermatol 1988, 90 (5), 720-724.

(35) Martelli, P.; Bovalini, L.; Ferri, S.; Franchi, G. G.; Bari, M. Active oxygen forms in photoreaction between DNA and furanochromones khellin and visnagin. FEBS 1985, 189 (2), 255-257.

(36) Trabalzini, L.; Martelli, P.; Bovalini, L.; Dall'Acqua, F.; Sage, E. Photosensitization of DNA of defined sequence by furochromones, khellin and visnagin. J Photochem Photobiol 1990, 7, 317-336.

(37) Michel, A.; Johnson, R. D.; Duke, S. O.; Scheffler, B. E. Dose-response relationships between herbicides with different modes of action and growth of *Lemna paucicostata*: an improved centoxicological method. Environ Toxicol Chem 2004, 23 (4), 1074-1079.

(38) Seefeldt, S. S.; Jensen, J. E.; Fuerst, E. P. Log-logistic analysis of herbicide dose-response relationships. Weed Technol 1995, 9 (2), 218-227.

(39) Ritz, C.; Streibig, J. C. Bioassay analysis using R. J Stat Softw 2005, 12, 1-22.

(40) R-Development Core Team. R: A language and environment for statistical computing. R Foundation for Statistical Computing: Viena, Austria 2009, p 409.

(41) Di Rienzo, J. A.; Casanoves, F.; Balzarini, M. G.; Gonzalez, L.; Tablada, M.; Robledo, C. W. InfoStat version 2015. http://www.infostat.com.ar.

What we claim is:

1. A method for controlling weeds comprising applying an herbicidally effective amount of a formulation comprising a compound selected from 1-benzopyran-4-one; 4,9-dimethoxy-7-methyl-5H-furo[3,2-g]chromen-5-one; 4-methoxy-7-methyl-5H-furo[3,2-g]chromen-5-one; Khellol-glucoside; 4,9-dimethoxy-5-oxo-5H-furo[3,2-g]chromen-7-carboxilic acid; 4-hydroxy-9-methoxy-7-methyl-5H-furo[3,2-g]chromen-5-one; and 4,9-dihydroxy-7-methyl-5H-furo[3,2-g]chromen-5-one; or mixtures thereof, to a locus in need of weed control at a dose of 2-20 kg of the compound $ha^{-1}$.

2. The method of claim 1, wherein the compound is applied at a dose of 2-8 kg $ha^{-1}$.

3. The method of claim 2, wherein the compound is applied at a dose of 2-4 kg $ha^{-1}$.

4. The method of claim 2, wherein the compound is applied at a dose of 8 kg $ha^{-1}$.

5. The method of claim 1, wherein the formulation comprises an agriculturally acceptable vehicle comprising at least one ingredient selected from solid and liquid diluents or carriers, pH buffers, surfactants, stabilizing agents, preservatives, coloring agents, wetting agents, dispersants, emulsifiers and defoaming agents.

6. The method of claim 1, wherein the compound is present in the formulation in a concentration ranging from 1-90% w/v.

7. A method for controlling weeds comprising applying to a locus in need of weed control an herbicidally effective amount of a formulation comprising a compound selected from 1-benzopyran-4-one; 4,9-dimethoxy-7-methyl-5H-furo[3,2-g]chromen-5-one; 4-methoxy-7-methyl-5H-furo[3,2-g]chromen-5-one; Khellol-glucoside; 4,9-dimethoxy-5-oxo-5H-furo[3,2-g]chromen-7-carboxilic acid; 4-hydroxy-9-methoxy-7-methyl-5H-furo[3,2-g]chromen-5-one; and 4,9-dihydroxy-7-methyl-5H-furo[3,2-g]chromen-5-one; or mixtures thereof, wherein the compound is present in the formulation in a concentration ranging from 1 to 90% w/v.

8. The method of claim 7, wherein the formulation comprises an agriculturally acceptable vehicle comprising at least one ingredient selected from solid and liquid diluents or carriers, pH buffers, surfactants, stabilizing agents, preservatives, coloring agents, wetting agents, dispersants, emulsifiers and defoaming agents.

9. The method of claim 8, wherein the compound is applied at a dose of 2-8 kg $ha^{-1}$.

10. The method of claim 9, wherein the compound is applied at a dose of 2-4 kg $ha^{-1}$.

11. The method of claim 9, wherein the compound is applied at a dose of 8 kg $ha^{-1}$.

\* \* \* \* \*